(12) United States Patent  (10) Patent No.: US 8,294,285 B2
Hunter  (45) Date of Patent: *Oct. 23, 2012

(54) POWER PACKAGING WITH RAILCARS

(75) Inventor: Jefferey Allen Hunter, Troy, OH (US)

(73) Assignee: F3 & I2, LLC, Troy, OH (US)

( * ) Notice: Subject to any disclaimer, the term of this patent is extended or adjusted under 35 U.S.C. 154(b) by 443 days.

This patent is subject to a terminal disclaimer.

(21) Appl. No.: 12/605,890

(22) Filed: Oct. 26, 2009

(65) Prior Publication Data

US 2010/0060093 A1  Mar. 11, 2010

Related U.S. Application Data

(63) Continuation-in-part of application No. 12/210,527, filed on Sep. 15, 2008, now Pat. No. 7,608,934, which is a continuation of application No. PCT/US2008/076156, filed on Sep. 12, 2008.

(60) Provisional application No. 61/088,885, filed on Aug. 14, 2008.

(51) Int. Cl.
| | |
|---|---|
| F02B 63/04 | (2006.01) |
| F03G 7/08 | (2006.01) |
| H02K 7/18 | (2006.01) |
| F01C 13/00 | (2006.01) |
| F01D 15/10 | (2006.01) |
| F02C 6/00 | (2006.01) |
| F02D 25/00 | (2006.01) |
| F02D 29/06 | (2006.01) |
| H02P 9/04 | (2006.01) |

(52) U.S. Cl. ........................................ 290/1 R; 290/4 R

(58) Field of Classification Search .................. 290/1 R, 290/4 R
See application file for complete search history.

(56) References Cited

U.S. PATENT DOCUMENTS

| 1,380,123 A | * | 5/1921 | Sullivan | .......................... 290/1 A |
| 2,482,924 A | | 9/1949 | Melcher | .......................... 290/1 A |
| 2,591,848 A | | 4/1952 | McClean | .......................... 105/35 |

(Continued)

FOREIGN PATENT DOCUMENTS

KR  20000004141 A  1/2000

OTHER PUBLICATIONS

International Search Report and Written Opinion dated Jan. 7, 2009 pertaining to International application No. PCT/US2008/076156 filed Sep. 12, 2008.

*Primary Examiner* — Pedro J Cuevas

(74) *Attorney, Agent, or Firm* — Dinsmore & Shohl LLP

(57) ABSTRACT

An energy generating module includes an enclosure, a modular cage, a fuel chamber, and a railcar chassis. The energy generating module is transportable on rails via the railcar chassis. The modular cage comprises a peripheral cage secured to an interior of the enclosure and one or more multi-directional extensions extending from the peripheral cage to support an energy generating device within the enclosure. The multi-directional extensions are movable in multiple directions as the peripheral cage sways during transportation of the energy generating module so as to permit the energy generating device to track its inertial position more closely than the sway of the peripheral cage during transportation of the energy generating module. The fuel chamber is configured to be in fluid communication with the energy generating device.

22 Claims, 14 Drawing Sheets

U.S. PATENT DOCUMENTS

| | | | | |
|---|---|---|---|---|
| 2,598,336 | A | 5/1952 | Anderson | 105/133 |
| 2,789,234 | A * | 4/1957 | Davies et al. | 290/1 R |
| 2,799,782 | A | 7/1957 | Armstrong et al. | 290/1 B |
| 3,093,194 | A | 6/1963 | Rusconi | 416/119 |
| 3,191,710 | A | 6/1965 | Reynolds | 180/292 |
| 3,418,485 | A * | 12/1968 | Anderson et al. | 290/1 R |
| 3,453,443 | A | 7/1969 | Stoeckly | 290/2 |
| 3,536,928 | A * | 10/1970 | Jones, Jr. et al. | 290/1 B |
| 3,781,139 | A * | 12/1973 | Lohse | 417/313 |
| 3,894,705 | A | 7/1975 | Glassmeyer | 248/674 |
| 3,906,686 | A | 9/1975 | Dillon | 52/79.9 |
| 4,098,077 | A | 7/1978 | Edmaier et al. | 60/272 |
| 4,130,208 | A | 12/1978 | Barry | 414/334 |
| 4,136,432 | A * | 1/1979 | Melley, Jr. | 29/469 |
| 4,226,214 | A * | 10/1980 | Palazzetti | 123/2 |
| 4,342,921 | A | 8/1982 | Williams | 290/2 |
| 4,548,164 | A * | 10/1985 | Ylonen et al. | 123/2 |
| 4,593,756 | A | 6/1986 | Itoh et al. | 165/151 |
| 4,759,294 | A | 7/1988 | Schuller et al. | 105/355 |
| 4,875,811 | A | 10/1989 | Merrett et al. | 406/39 |
| 4,893,567 | A | 1/1990 | Hill et al. | 105/419 |
| 4,992,669 | A * | 2/1991 | Parmley | 290/1 R |
| 5,065,581 | A | 11/1991 | Jenkins | 60/668 |
| 5,537,339 | A | 7/1996 | Naganuma et al. | 700/276 |
| 5,642,827 | A * | 7/1997 | Madsen | 220/1.5 |
| 5,675,194 | A | 10/1997 | Domigan | 307/147 |
| 5,706,735 | A | 1/1998 | Lund | 104/88.04 |
| 5,816,423 | A | 10/1998 | Fenton et al. | 220/1.5 |
| 5,899,174 | A * | 5/1999 | Anderson et al. | 123/2 |
| 5,965,949 | A * | 10/1999 | Fukuda et al. | 290/1 A |
| 5,979,334 | A | 11/1999 | Lund | 104/88.04 |
| 6,009,802 | A * | 1/2000 | Schaaf et al. | 100/39 |
| 6,182,807 | B1 | 2/2001 | Saito et al. | 191/2 |
| 6,390,215 | B1 | 5/2002 | Kodama et al. | 180/65.22 |
| 6,393,775 | B1 * | 5/2002 | Staschik | 52/79.1 |
| 6,401,891 | B1 | 6/2002 | Saito et al. | 191/2 |
| 6,408,998 | B1 | 6/2002 | Saito et al. | 191/2 |
| 6,435,796 | B1 | 8/2002 | Iversen | 414/139.9 |
| 6,479,973 | B2 | 11/2002 | Saito et al. | 323/282 |
| 6,520,124 | B2 * | 2/2003 | Bohm, II | 123/2 |
| 6,532,398 | B2 * | 3/2003 | Matsumoto | 700/213 |
| 6,546,312 | B1 * | 4/2003 | Matsumoto | 700/213 |
| 6,546,878 | B1 | 4/2003 | Smith et al. | 105/404 |
| 6,601,542 | B2 * | 8/2003 | Campion | 123/2 |
| 6,608,392 | B2 * | 8/2003 | Matsumoto | 290/1 A |
| 6,615,741 | B2 * | 9/2003 | Fecko et al. | 105/404 |
| 6,616,118 | B2 | 9/2003 | Nortier | 251/40 |
| 6,619,904 | B1 | 9/2003 | Barry | 414/337 |
| 6,622,506 | B2 * | 9/2003 | Sanders | 62/243 |
| 6,659,016 | B2 | 12/2003 | Forbes | 105/355 |
| 6,688,048 | B2 | 2/2004 | Staschik | 52/79.1 |
| 6,765,304 | B2 * | 7/2004 | Baten et al. | 290/1 A |
| 6,769,521 | B2 | 8/2004 | Saito et al. | 191/2 |
| 6,786,051 | B2 | 9/2004 | Kristich et al. | 60/796 |
| 6,877,581 | B2 | 4/2005 | Badr et al. | 180/311 |
| 6,893,487 | B2 * | 5/2005 | Alger et al. | 95/273 |
| 6,920,828 | B2 | 7/2005 | Forbes | 105/198.2 |
| 6,973,880 | B2 | 12/2005 | Kumar | 105/35 |
| 7,028,819 | B2 | 4/2006 | Saito et al. | 191/2 |
| 7,081,682 | B2 * | 7/2006 | Campion | 290/1 A |
| 7,122,913 | B2 * | 10/2006 | Witten et al. | 290/1 A |
| 7,221,061 | B2 * | 5/2007 | Alger et al. | 290/1 R |
| 7,230,819 | B2 | 6/2007 | Muchow et al. | 361/601 |
| 7,328,659 | B2 | 2/2008 | Forbes | 105/198.2 |
| 7,466,033 | B2 * | 12/2008 | Witten et al. | 290/1 A |
| 7,589,429 | B2 * | 9/2009 | Hunter | 290/1 A |
| 8,207,621 | B2 * | 6/2012 | Hunter | 290/1 A |
| 8,235,009 | B2 * | 8/2012 | Hunter | 123/3 |
| 2001/0028241 | A1 | 10/2001 | Saito et al. | 323/282 |
| 2002/0043964 | A1 | 4/2002 | Saito et al. | 323/282 |
| 2002/0070870 | A1 | 6/2002 | Huang | 340/685 |
| 2002/0153726 | A1 | 10/2002 | Sumner | 290/1 A |
| 2002/0189173 | A1 | 12/2002 | Staschik | 52/79.1 |
| 2003/0001434 | A1 | 1/2003 | Saito et al. | 307/10.1 |
| 2003/0024429 | A1 | 2/2003 | Forbes | 105/404 |
| 2003/0030279 | A1 | 2/2003 | Campion | 290/1 A |
| 2003/0062707 | A1 | 4/2003 | Koch | 280/401 |
| 2003/0098211 | A1 | 5/2003 | Saito et al. | 191/3 |
| 2003/0136794 | A1 | 7/2003 | Chirnomas | 221/123 |
| 2004/0026441 | A1 | 2/2004 | Chirnomas | 221/92 |
| 2005/0161289 | A1 | 7/2005 | Gomez-Nacer | 185/15 |
| 2005/0168072 | A1 | 8/2005 | Saito et al. | 307/10.1 |
| 2005/0211720 | A1 | 9/2005 | Chirnomas | 221/92 |
| 2006/0006652 | A1 | 1/2006 | Witten et al. | 290/1 A |
| 2006/0095180 | A1 | 5/2006 | Ummerhala et al. | 701/37 |
| 2006/0226612 | A1 | 10/2006 | Smith et al. | 280/6.153 |
| 2006/0279976 | A1 * | 12/2006 | Witten et al. | 363/157 |
| 2007/0050191 | A1 | 3/2007 | Weider et al. | 704/275 |
| 2007/0284159 | A1 | 12/2007 | Takami et al. | 180/65.1 |
| 2008/0053722 | A1 | 3/2008 | O'Neill | 180/65.265 |
| 2008/0190183 | A1 | 8/2008 | Erlach et al. | 73/114.01 |
| 2008/0314659 | A1 | 12/2008 | Einola et al. | 180/65.25 |
| 2009/0045773 | A1 | 2/2009 | Pandya et al. | 320/108 |
| 2009/0064808 | A1 | 3/2009 | Parison et al. | 74/1 R |
| 2009/0066091 | A1 * | 3/2009 | Hunter | 290/1 A |
| 2009/0108552 | A1 | 4/2009 | Mann et al. | 280/79.3 |
| 2010/0025409 | A1 * | 2/2010 | Hunter | 220/567.2 |
| 2010/0060016 | A1 * | 3/2010 | Hunter | 290/1 R |
| 2010/0192908 | A1 | 8/2010 | Hunter | 123/3 |
| 2010/0230414 | A1 | 9/2010 | Hunter | 220/553 |
| 2012/0074012 | A1 * | 3/2012 | Crane | 206/386 |
| 2012/0076603 | A1 * | 3/2012 | Crane et al. | 410/46 |
| 2012/0076604 | A1 * | 3/2012 | Crane et al. | 410/46 |
| 2012/0076605 | A1 * | 3/2012 | Crane et al. | 410/46 |
| 2012/0076607 | A1 * | 3/2012 | Crane et al. | 410/94 |

* cited by examiner

POWER PACKAGING WITH RAILCARS

CROSS-REFERENCE TO RELATED APPLICATIONS

The present application is filed under 35 U.S.C. 111(a) as a continuation-in-part of U.S. patent application Ser. No. 12/210,527 (HUR 0002 N2) which is a continuation of International Patent Application No. PCT/US08/76156 (HUR 0002 PC), which international application designates the United States and claims the benefit of U.S. Provisional Application Ser. No. 61/088,885 (HUR 0002 MA/38469.5), filed Aug. 14, 2008.

BACKGROUND

Several factors are driving demand for auxiliary power modules that are commonly used for industrial, construction, mining, oil & gas exploration, and commercial applications. These power modules typically utilize diesel engines that, when combined with other electrical components, are used to generate electricity. The resulting electric power output is then used for both prime (primary source) and backup (redundant source) power. For industrial applications, such power modules are used to support either prime or backup electricity within factories; for construction, mining, and oil & gas applications, power modules typically are used to generate prime power for the equipment given the locations frequently are too distant for connection to the municipal electrical grid; and for commercial applications, power modules typically are used for backup power for the electric systems should the municipal electrical grid lose power due to a storm, natural disasters, sabotage, etc.

Transporting a portable power module to locations via conventional means over roads, as generally taught in the prior art, has limitations. Despite the quantity or quality of today's extensive road networks, there are limitations involving the weight and dimensions of the power modules' enclosures and contents. While some variations are permissible, the road system is constrained in allowing larger portable power modules from being transported. Other prior art has suggested solutions for transporting portable power modules, but none meet unique needs that can be solved using railcars as described herein.

Integration of a power module with a railcar enables the rapid deployment of power modules to remote job sites by using conventional rails. The rail network reaches countless thousands of miles that are un-serviced by conventional roads and, therefore, the capability of transporting power modules to remote areas thus can be met using the present embodiments. Further, an added advantage of the embodiments relates to improving the speed of transport when projecting electrical generating capacity to sites as the rail network bypasses traditional "pinch points" of road congestion. It also bypasses the legislative limitations upon commercial driving hours imposed upon those navigating the road network. All of which become more problematic at times of natural disaster or other emergencies.

SUMMARY

Embodiments of the present disclosure relate generally to energy generating modules that comprise energy generating devices configured to generate energy outputs that may be transferred to energy consuming or transferring devices or systems, such as, but not limited to vehicles or electric power grids. Further, the energy generating modules comprise a railcar chassis and are transportable over rails. In addition, the energy generating modules comprise a modular cage comprising a peripheral cage that sways during transportation of the energy generating modules and one or more multi-directional extensions that permit the energy generating device to track its inertial position more closely than the sway of the peripheral cage during transportation of the energy generating modules.

In accordance with one exemplary embodiment, an energy generating module includes an enclosure, a modular cage, a fuel chamber, and a railcar chassis. The energy generating module is transportable on rails via the railcar chassis. The modular cage comprises a peripheral cage secured to an interior of the enclosure and one or more multi-directional extensions extending from the peripheral cage to support an energy generating device within the enclosure. The multi-directional extensions are movable in multiple directions as the peripheral cage sways during transportation of the energy generating module so as to permit the energy generating device to track its inertial position more closely than the sway of the peripheral cage during transportation of the energy generating module. The fuel chamber is configured to be in fluid communication with the energy generating device.

In accordance with another exemplary embodiment, an energy generating module includes an enclosure, a modular cage, a fuel chamber, a boom system, and a railcar chassis. The energy generating module is transportable on rails via the railcar chassis. The modular cage includes a peripheral cage secured to an interior of the enclosure and one or more multi-directional extensions extending from the peripheral cage that are configured to support an energy generating device within the enclosure. The fuel chamber is configured to be in fluid communication with the energy generating device. The enclosure comprises a boom system extendable from and retractable to an exterior of the enclosure such that the boom system may extend and retract between a position in-line with, and conforming to, a footprint of the exterior of the enclosure and a position projecting outward or upward from the exterior of the enclosure. The boom system also includes a plurality of energy-transfer receptacles operable to be deployed when projecting outward or upward from the exterior of the enclosure.

In accordance with yet another exemplary embodiment, an energy generating system includes an enclosure, a modular cage, a fuel chamber, one or more peripheral railcars, and a railcar chassis. The energy generating module is transportable on rails via the railcar chassis. The modular cage comprises a peripheral cage secured to an interior of the enclosure and one or more multi-directional extensions extending from the peripheral cage that are configured to support the energy generating device within the enclosure. The multi-directional extensions are movable in multiple directions as the peripheral cage sways during transportation of the energy generating module so as to permit the energy generating device to track its inertial position more closely than the sway of the peripheral cage during transportation of the energy generating module. The fuel chamber is supported by the peripheral railcars such that the fuel chamber is remotely coupled to the energy generating module.

BRIEF DESCRIPTION OF THE DRAWINGS

The following detailed description of specific embodiments can be best understood when read in conjunction with the following drawings in which.

Figure 1:
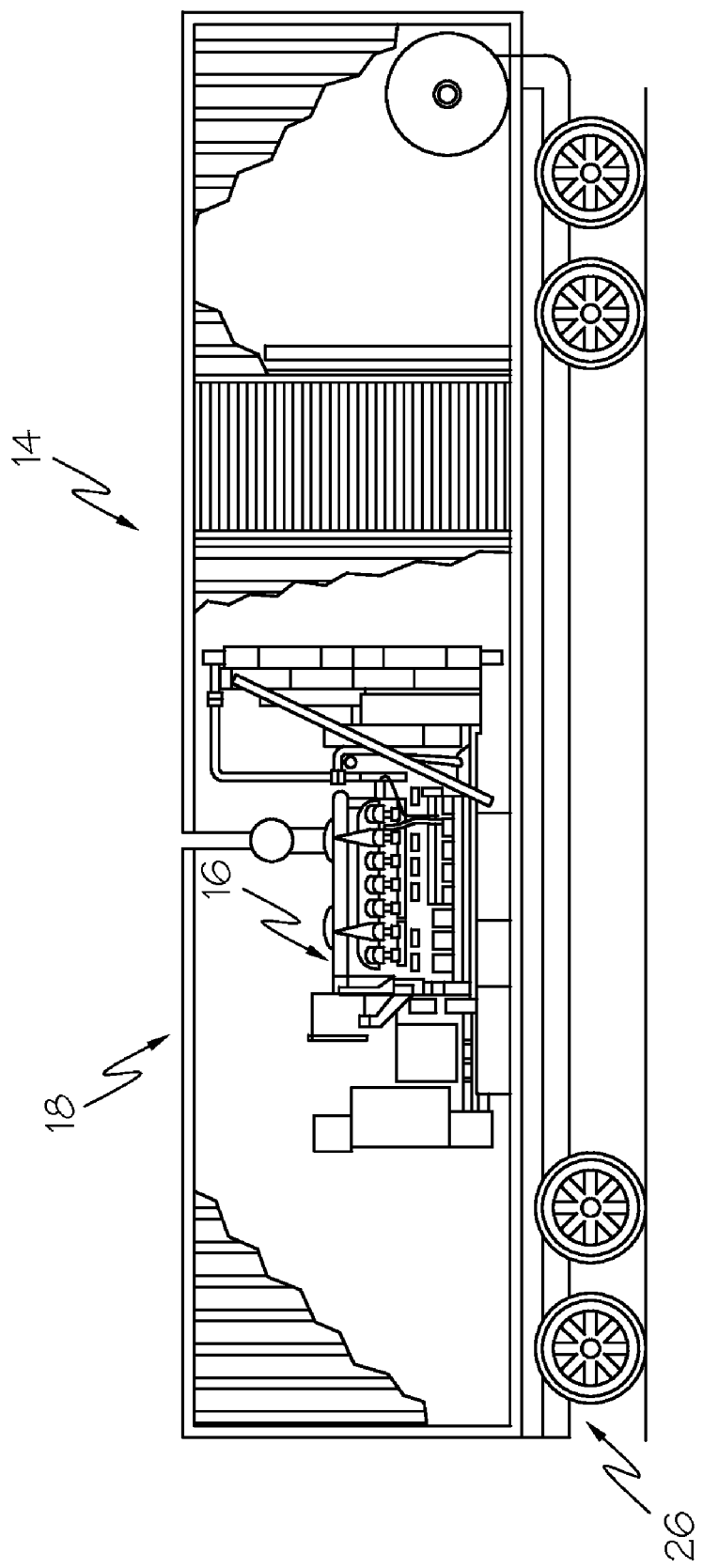
FIG. 1 is an illustration of a cross-sectional side view of an energy generating module according to one or more embodiments.
Figure 2:
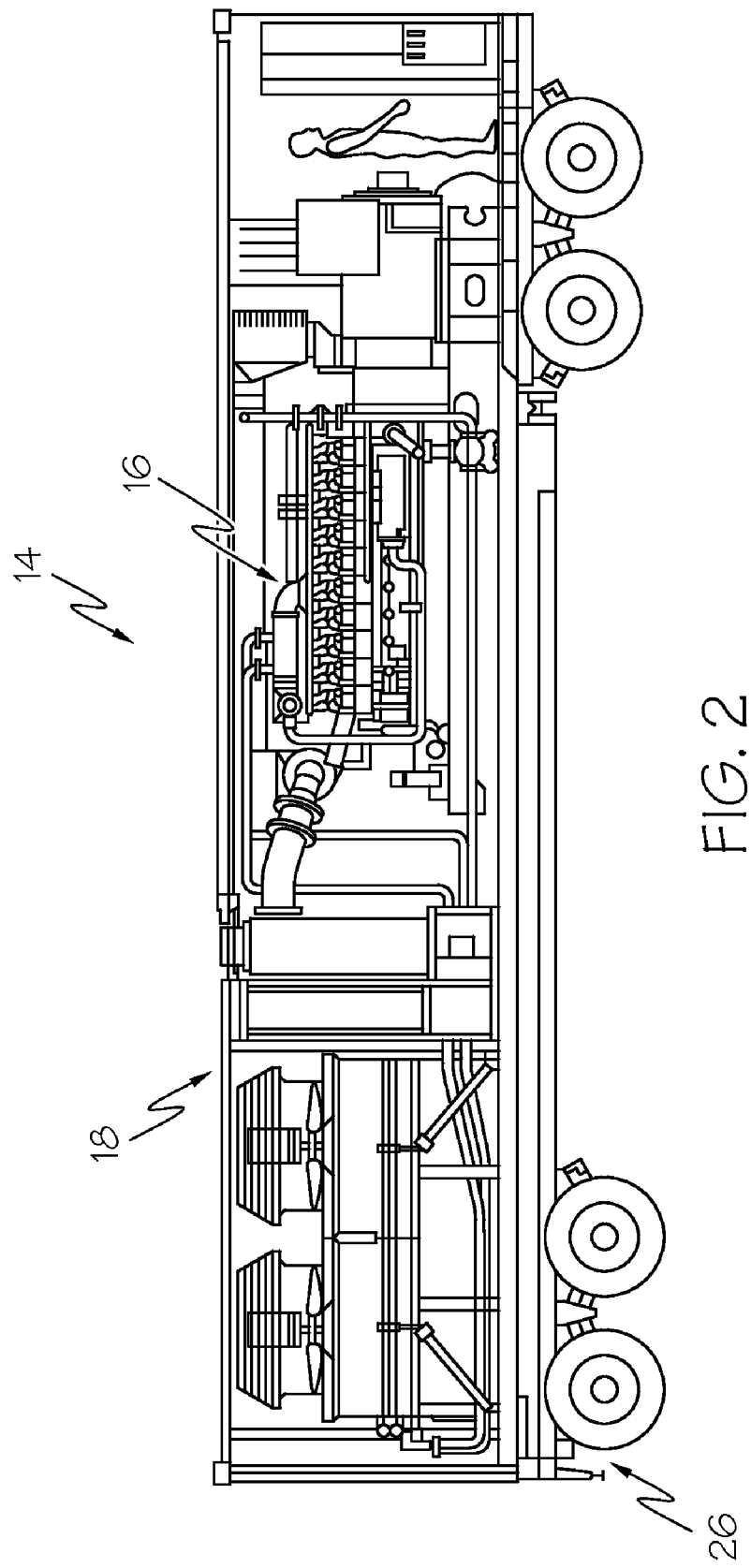
FIG. 2 is an illustration of a cross-sectional side view of an energy generating module according to one or more embodiments.
Figure 3:
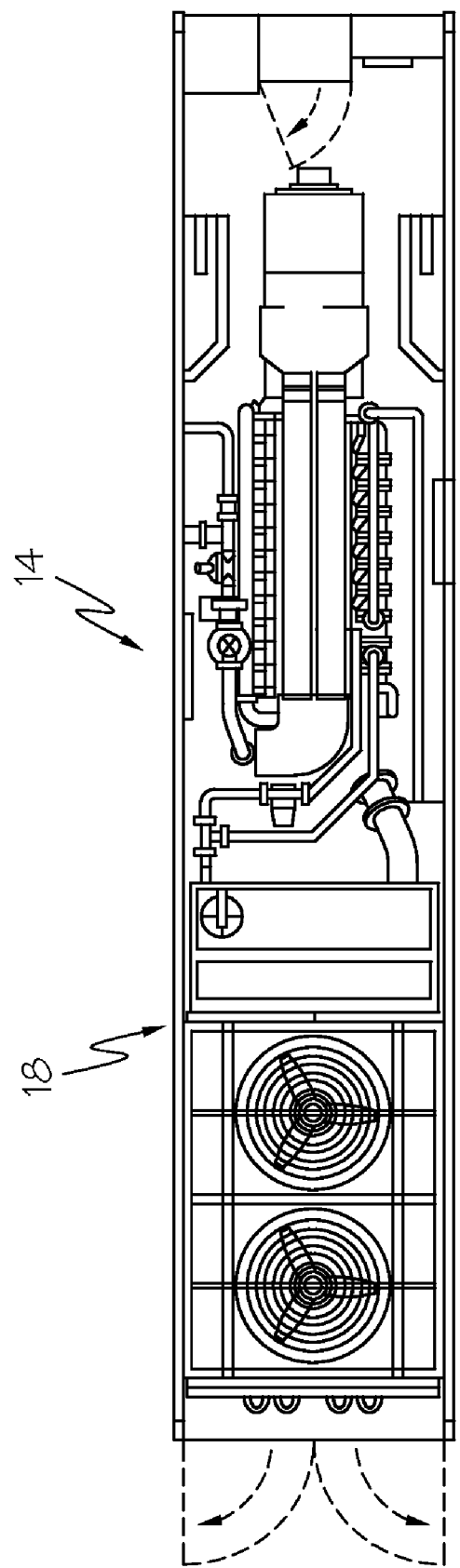
FIG. 3 is an illustration of a cross-sectional top view of an energy generating module according to one or more embodiments.

The embodiments set forth in the drawings are illustrative in nature and are not intended to be limiting of the embodiments defined by the claims. Moreover, individual aspects of the drawings and the embodiments will be more fully apparent and understood in view of the detailed description.

DETAILED DESCRIPTION

Referring initially to FIGS. 4, 6, 9A, and 9B, embodiments relate generally to an energy generating module 14 comprising an energy generating device 16, an enclosure 18 for the energy generating device 16, a modular cage 20, a fuel chamber 22, an energy-transfer receptacle 24, and a railcar chassis 26. The energy generating module 14 is transportable on rails via the railcar chassis 26. As such, the energy generating module 14 is transportable to many areas inaccessible by roads, yet penetrated by rail lines. To minimize the effect of sway of railcars, and equipment supported thereon, typically associated with rail travel, the energy generating module 14 utilizes a modular cage 20 that supports the energy generating device 16 within the enclosure 18.

It is noted that in some embodiments, the energy generating module may not include an energy generating device, thereby providing the flexibility for a user to add or change one or more energy generating devices to the energy generating module as needed. The energy generating modules described herein may also be utilized to store equipment, parts or other goods rather than an energy generating device as well as fuel to power external engines, vehicles or other devices.

Figure 4:
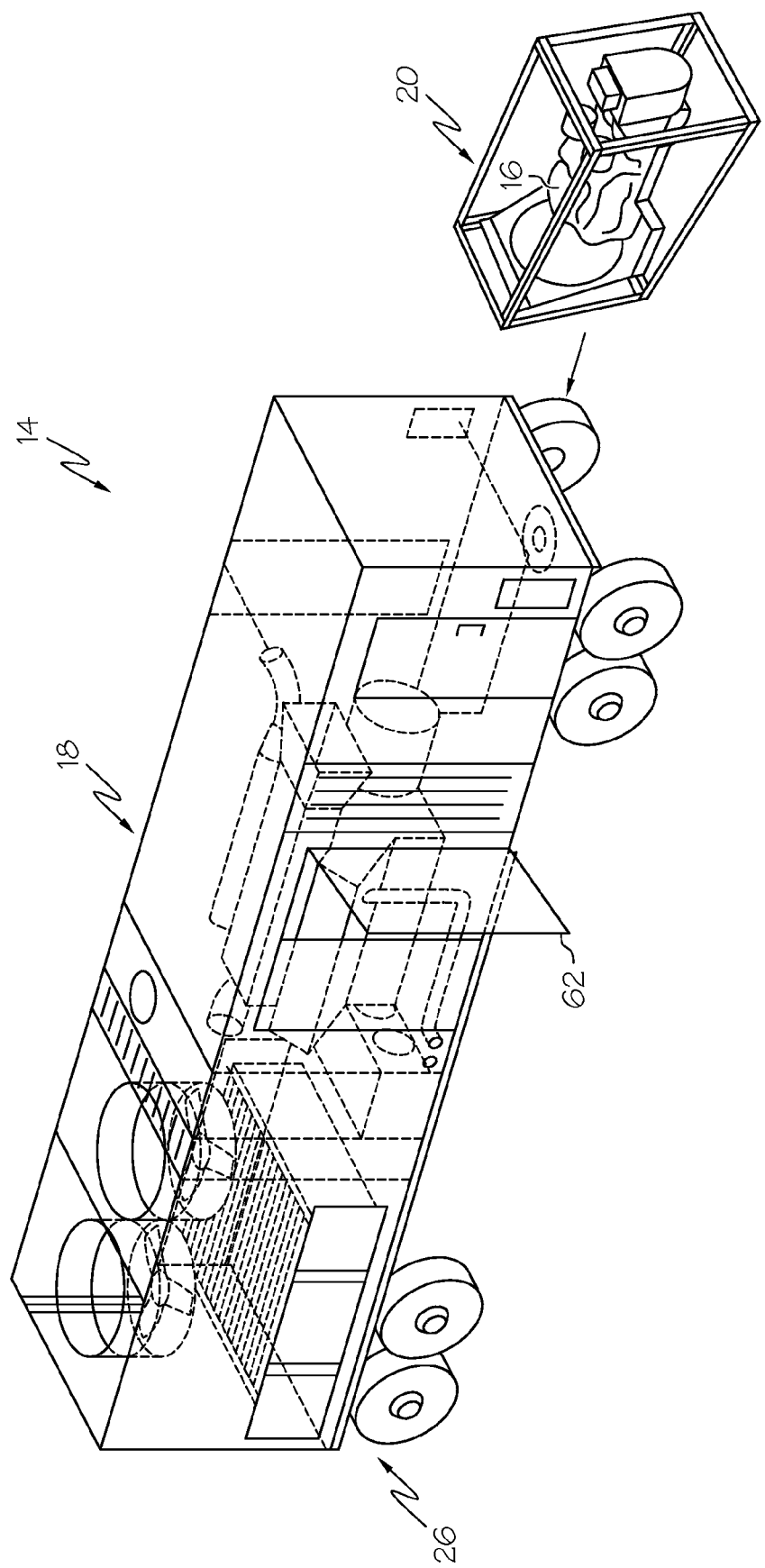
FIG. 4 is an illustration of a perspective view of a modular cage according to one or more embodiments.
Figure 5:
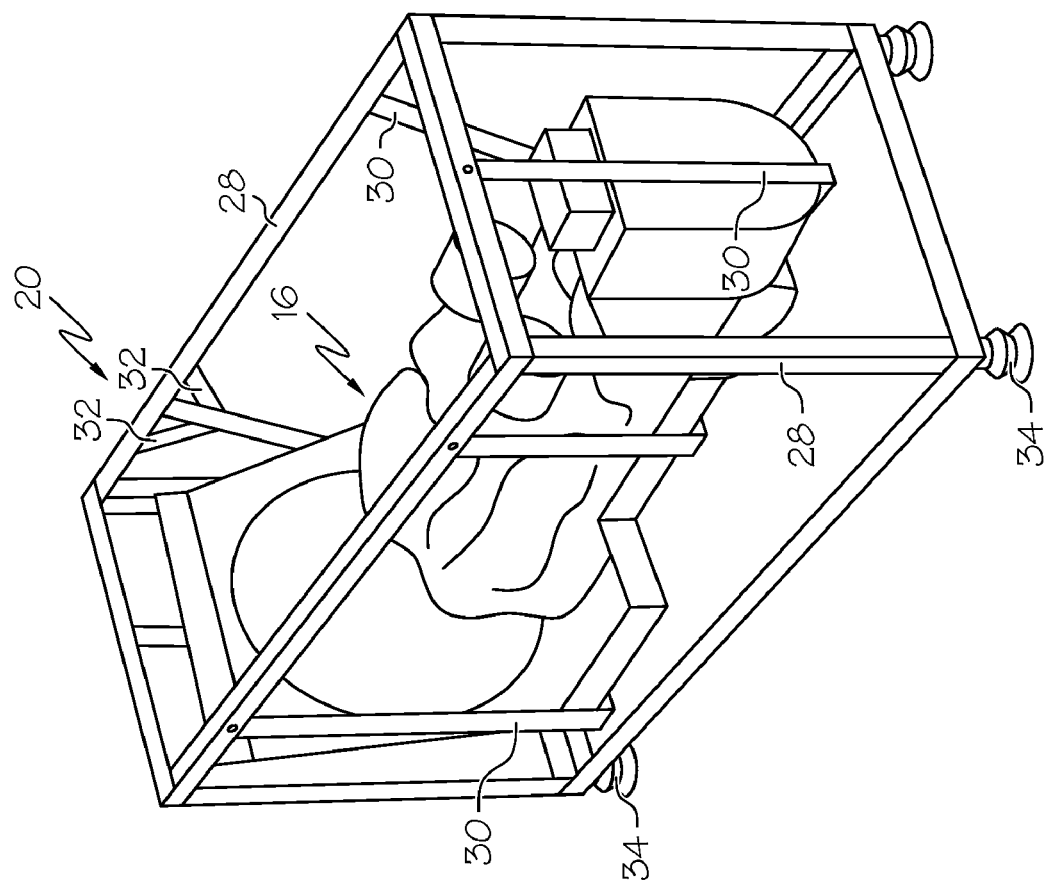
FIG. 5 is an illustration of a perspective view of a modular cage and an energy generating device according to one or more embodiments.
Figure 12:
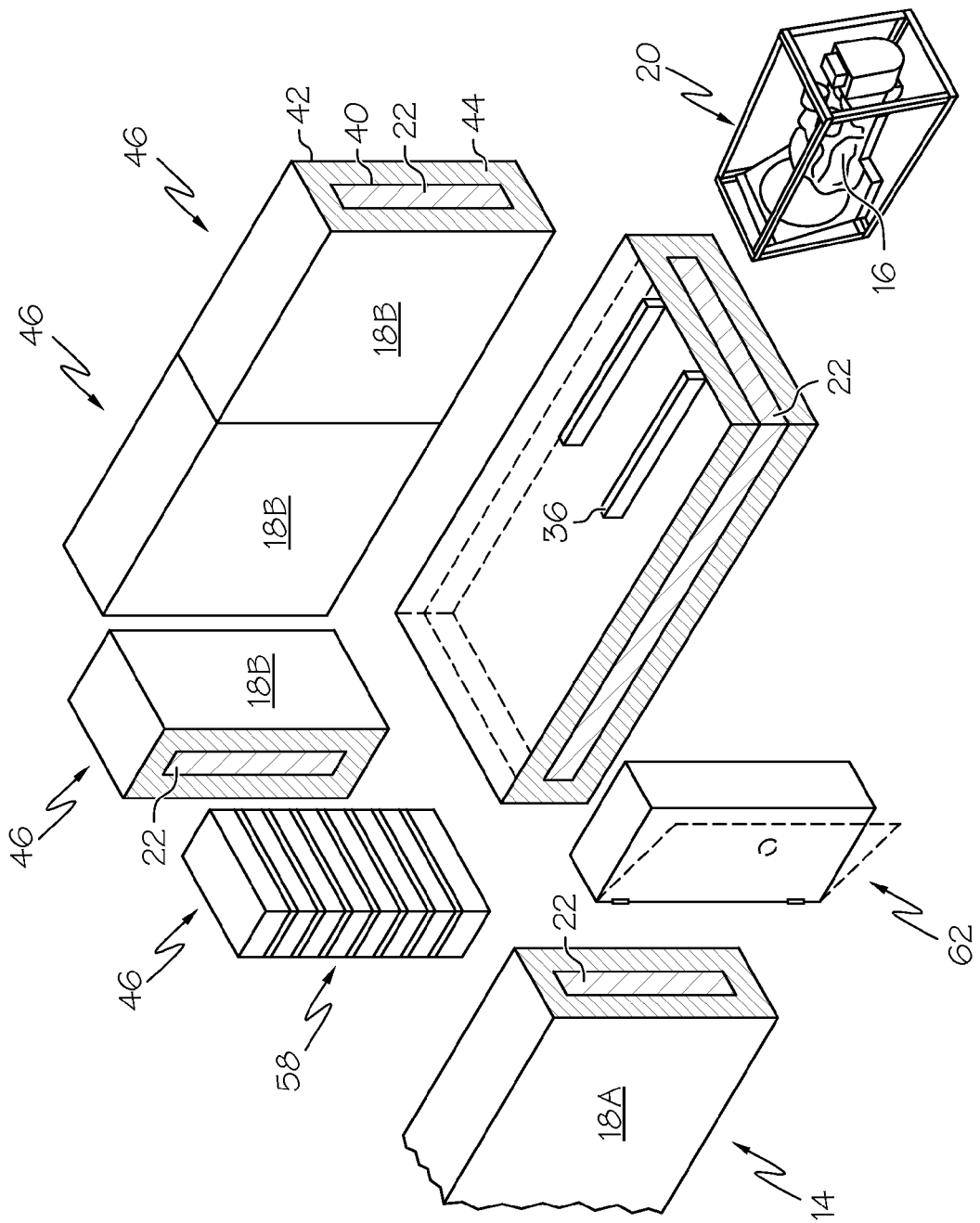
FIG. 12 is an illustration of a perspective view of a plurality of modular energy panels forming an enclosure of an energy generating module according to one or more embodiments.

The modular cage 20, shown in FIGS. 4, 5, and 12, comprises a peripheral cage 28 and one or more multi-directional extensions 30. The peripheral cage 28 may be secured to an interior of the enclosure 18. As such, when secured to the interior of the enclosure 18, the peripheral cage 28 sways with the enclosure 18 during transportation of the energy generating module 14. The multi-directional extensions 30 extend from the peripheral cage 28 and support the energy generating device 16 within the enclosure 18. The multi-directional extensions 30 are movable in multiple directions as the peripheral cage 28 sways during transportation of the energy generating module 14. In one exemplary embodiment, the multi-directional extensions 30 each define multiple directions of movement. In another exemplary embodiment, at least one of the multi-directional extensions 30 defines a single direction of movement and the multi-directional extensions 30 collectively define multiple directions of movement. The multi-directional extensions 30, with the ability to move in multiple directions, permit the energy generating device 16 to track its inertial position more closely than the sway of the peripheral cage 28 during transportation of the energy generating module 14. More particularly, the multi-directional extensions 30 may be moveable in multiple directions so as to permit the energy generating device 16 to track its lateral inertial position, its vertical inertial position, or a combination thereof, more closely than the sway of the peripheral cage 28 during transportation of the energy generating module 14. Thereby, the effect of the sway of the peripheral cage 28 on the energy generating device 16 is limited.

The multi-directional extensions 30 may support the energy generating device 16 by suspending the energy generating device 16 within boundaries generally limited by movement of the multi-directional extensions 30 in multiple directions during transportation of the energy generating module 14. This suspension of the energy generating device 16 may be achieved with one or more of any variety of multi-directional extensions 30, such as, but not limited to, a chain, a rope, a strap, a band, a net, etc. Further, the multi-directional extensions 30 may comprise a degree of elasticity sufficient to facilitate movement of the multi-directional extensions 30 in multiple directions in permitting the energy generating device 16 to track its inertial position more closely than the sway of the peripheral cage 28 during transportation of the energy generating module 14.

The modular cage 20 also may comprise one or more movement dampening mechanisms 32, as shown in FIG. 5. The movement dampening mechanisms 32 may dampen movement of one or more of the multi-directional extensions 30 during transportation of the energy generating module 14. The movement dampening mechanisms 32 may be, for example, shock absorbers positioned to limit movement of the multi-directional extensions 30 or bands configured to partially restrain movement of the multi-directional extensions 30, or other movement dampening mechanisms. In addition, the modular cage 20 may comprise a suspension 34 affixed to the peripheral cage 28. The suspension 34 of the modular cage 20 may reduce the sway of the peripheral cage 28 during transportation of the energy generating module 14. Thereby, the suspension 34 may limit the effect of sway of the enclosure 18 on the energy generating device 16 during transportation of the energy generating module 14.

Further, the modular cage 20 may be repeatedly insertable into and withdrawable from the interior of the enclosure 18. In one exemplary embodiment, the peripheral cage 28 of the modular cage 20 is secured to the interior of the enclosure by interlocking with one or more guide rails 36. The guide rails 36, shown in FIG. 12, may complement a portion of the peripheral cage 28 and be affixed to the interior of the enclosure 18. The guide rails 36 may repeatedly secure and release the peripheral cage 28 from its interlocking with the guide rails 36. The interlocking of the peripheral cage 28 with the guide rails 36 may be achieved by one or more of any variety of locking mechanisms, such as, but not limited to, spring-based locking pins of the guide rails 36 into recesses of the peripheral cage 28, clamps of the guide rails 36 closable over the peripheral cage 28, or other locking mechanisms. Such features of the modular cage 20 permit greater flexibility of the energy generating module 14 and the use of its components, which may be interchangeable within enclosures 18 and energy generating modules 14, assuming a "plug-and-play" configuration.

An energy generating device 16 supported by the modular cage 20 is configured to generate an energy output that may be transferred to any energy consuming or transferring device or system. For example, but not by way of limitation, the energy generating device 16 may be a generator engine that generates electric power output, a boiler that generates heat and/or warm air output, a chiller that generates cool air output, an air compressor that generates forced air output, or any other energy generating device configured to generate or otherwise produce an energy output. The energy output may be transferred by the energy generating module 14, via an energy-transfer receptacle 24 or otherwise, to any device or system consuming, transferring, or otherwise utilizing the generated energy output. As used herein, "transfer" refers to a transmission, discharge, or other distribution of an energy output or fuel from the energy generating module 14 to any energy consuming or transferring device or system (e.g., a vehicle, a battery or other energy storing device, and an electrical power grid) and an energy input from an energy producing device or system (e.g., an external generator, electrical power grid, solar panels, etc.) to the energy generating device. The energy-transfer receptacle 24 may therefore provide for energy input and output to and from the energy generating module 14. Solely for purposes of simplifying the description of various embodiments of the present disclosure, the disclosure provided herein refers generally to an energy generating module 14 and not to any particular type of energy generating module, such as, for example, a power generating module that comprises a power generating device configured to generate electric power output with fuel receive from its fuel chamber. As such, the disclosure provided herein is not limited to any particular type or types of energy generating modules and is applicable to any type of energy generating module, as described herein. Further, as used herein, the term "module" refers to any configurable enclosure, whether transportable or fixed at a location, capable of at least partially enclosing an energy generating device 16 to produce an energy output for one or more of any variety or combination of uses, or capable of storing goods or providing a habitable space.

The energy generating device 16 generally, but not necessarily, is an fuel-driven engine configured to generate an energy output, such as electric power output. The energy generating device 16 may be, for example, a turbine engine, a reciprocating engine, an electric/gasoline (or other hybrid) engine, a combined heat and power engine (CHP), which may be used to direct the heat generated by the engine to a nearby facility for a productive use, a hydrogen fuel cell engine, a solar-powered engine, or a wind-driven engine. In fact, the energy generating module 14 may comprise one or more of any combination of energy generating devices 16 to enhance flexibility and/or energy output generation of the energy generating module 14.

With respect to the exemplary wind-driven engine embodiment, wind turbines, for example, may be mounted onto an exterior of the energy generating module 14 to generate an energy output, whether during transportation or while the energy generating module 14 is stationary. In this embodiment, the exterior walls of the enclosure 18 may comprise an exterior aerodynamic feature (e.g., a curved and/or flared shape) to create an increased airflow that may be provided to the blades of the wind turbine engine as the energy generating module 14 is transported on the rails. As an example, the energy generating module 14 may be equipped with a spoiler or an air dam to channel air into the blades of the wind turbine engine. The power generated by the wind turbine engine or engines may be stored in an energy storage device that may be located within the enclosure 18 (e.g., within the interlocking battery devices described herein). The power may then be utilized by energy consuming devices that are maintained within the energy generating module 14 such as, for example, electrical systems of the energy generating module 14 (e.g., lighting systems, cooling systems, etc.), or provided to external devices or systems requiring power via energy-transfer receptacles 24.

With respect to the exemplary solar-powered engine, solar panels, for example, may be provided to an exterior of the energy generating module 14 to generate an energy output. It is contemplated that the energy generating module 14 may comprise one or more of any variety of types of energy generating devices 16 to generate one or more types of energy outputs. For exemplary purposes only, the energy generating module 14 may comprise a turbine engine, a solar-powered engine, and a boiler, the energy generating module 14 may comprise a hydrogen fuel cell engine and a turbine engine, or the energy generating module 14 may comprise an electric/gasoline engine and a biofuel engine. With respect to an energy generating device 16 configured as a fuel-driven engine, the energy generating device 16 may be in fluid communication with the fuel chamber 22 and configured to generate an energy output with fuel received from the fuel chamber 22.

The energy generating module 14 also comprises an enclosure 18 for the energy generating device 16 so as to protect the energy generating device 16 from environmental elements (e.g., temperature, humidity, moisture, rain, snow, wind, etc.), theft, vandalism, among other potentially damaging threats. The enclosure 18 may be any structure having a roof, a floor, a pair of sidewalls, and a pair of endwalls that, when connected, provide a chamber-like interior capable of at least partially enclosing the energy generating device 16, and various other components associated with generating and/or transferring an energy output, and of serving as a workspace for personnel. As such, the enclosure 18 may be, for example, an ISO container, a drop-over enclosure, or any other enclosure or container configured to perform the purposes described herein. The enclosure 18 may be configured of any variety of different materials, such as, but not limited to, fiberglass, aluminum, stainless steel, carbon steel, or FRP (fiberglass-reinforced plastic). Other materials may also be utilized to form the enclosure for increased strength and durability. For example, the walls of the enclosure 18 may be configured of composite materials as well as nanomaterials both known and yet-to-be-developed for increased strength. While the enclosure 18 generally may be configured of carbon steel, any alternative material suitable for performing the tasks described herein and in the art may be utilized.

As shown in FIGS. 9A-12, the enclosure 18 of the energy generating module 14 generally comprises a plurality of exterior enclosure walls 18A and a plurality of interior enclosure walls 18B, the exterior enclosure walls 18A defining an exterior of the energy generating module 14 and the interior enclosure walls 18B defining an interior of the energy generating module 14. These exterior and interior enclosure walls 18A, 18B define, respectively, the exterior and interior roof, floor, sidewalls, and endwalls of the enclosure 18 of the energy generating module 14. While the exterior and interior enclosure walls 18A, 18B generally are linear, it is contemplated that one or more of the exterior and interior enclosure walls 18A, 18B, and/or any enclosure walls positioned therebetween, whether parallel, off-set, or perpendicular to the exterior and interior enclosure walls 18A, 18B, may be curved. Thereby, the interior of the energy generating module 14, the exterior of the energy generating module 14, or both, may assume a circular, semi-circular, or other curved shape. Curved walls may enhance the ability of the enclosure 18 to reduce the noise emanating from the energy generating device 16 that escapes the enclosure 18 to the surrounding environment. Further, curved walls may comprise one or more channels to substantially direct noise though specially designed ports to minimize the amount noise projected to the surrounding environment. The exterior and interior enclosure walls 18A, 18B, whether linear or curved, or combinations thereof, cooperate to form at least a portion of the fuel chamber 22 of the energy generating module 14, as described in greater detail herein.

In one exemplary embodiment, the enclosure 18 is integrally formed with the railcar chassis 26. Thereby, the railcar chassis 26 and the enclosure 18 cooperate to form a railway freight car. In another exemplary embodiment, the railcar chassis 26 is integrally formed with an intermodal railcar, other railway flatcar, or other railcar that supports the enclosure 18. As such, as described above, the enclosure 18, either integrally formed with the railcar chassis 26 or supported by an intermodal railcar or other railcar, typically sways during transportation of the energy generating module 14 over rails. In addition, it is contemplated that the railcar chassis 26 may be integrally formed with a railcar that may support any structure other than the enclosure 18 that may at least partially enclose an energy generating device 16. Further, it is contemplated that the railcar chassis 26 may be integrally formed with a railcar that may support an energy generating device 16, whether or not supported by a modular cage 20, without an enclosure 18 or other structure. It is also contemplated that the enclosure 18 of the energy generating module 14 may be removable from the railcar chassis 26 such that the energy generating module 14 may be transported via rail to a desired location and then removed from the railcar chassis 26 for remote operation. The energy generating module 14 may then be reconnected to a railcar chassis for future and further transport. The energy generating module 14 may be removably coupled to the railcar chassis 26 by any methods capable of securely connecting the energy generating module 14 to the railcar chassis 26, including, but not limited to, mechanical, electrical, hydraulic and pneumatic locking mechanisms. For example, a series of cam locks may be used to removably connect the energy generating module to the railcar chassis 26. After the cam locks are moved to an unlocked position, the energy generating module 14 may be lifted from the railcar chassis 26 by a lifting device such as a boom system, crane, or any other device capable of lifting the energy generating module 14 off of the railcar chassis 26. The lifting device may be incorporated into a dedicated lifting station or may be a mobile lifting device such as a boom system incorporated into a truck.

Transporting the energy generating module 14 via a railcar chassis 26, an intermodal railcar, a railway flatcar, a railway freight car, and enclosure-type railcar, or any other type of railcar may enable use of an enclosure 18 having larger interior dimensions and load carrying capacity than available through transporting energy generating modules over roads. Designers and/or engineers may then incorporate a larger, more powerful energy generating device 16 capable of generating more energy output. Greater energy output provides more flexibility for users as varying jobs and/or devices require varying levels of energy. Larger interior dimensions of the enclosure 18 provide additional space for greater fuel capacity, installation of a larger radiator for enhanced cooling (which may allow the energy generating device 16 to produced greater energy output without added risk of damage from overheating), and creation or expansion of workspace for personnel to operate safely within the enclosure 18.

The energy generating module 14 may comprise an energy storage device, such as a battery, such that energy output generated by the energy generating device 16 may be stored for transfer at a later time. In addition, or alternative thereto, kinetic energy produced by the railcar chassis 26 during transportation of the energy generating module 14 may be leveraged to generate an energy output, which may be captured and stored within an energy storing device of the energy generating module 14 for later transfer. The energy storage device may be capable of storing energy output and waste created by the energy generating device 16 or other external energy generating devices for later use. The output and/or waste generated by the energy generating device 16 may be used as an input into a device or system that is either internal or external to the energy generating module 14. In embodiments in which the energy generating module 14 includes a hydrogen fuel generator the energy generating device 16 may store water (e.g., within a portion of the fuel chamber 22) such that the water may be converted into hydrogen via an internal hydrogen generator maintained within the enclosure 18 (or externally provided). The resulting hydrogen may be stored within one or more fuel chambers 22. The fuel chamber 22 may be equipped to store hydrogen in a liquid form, as a pressurized tank to store it in a gaseous from, and or chemically bonded to a chemical such as hydrides which can be later released using heat internally or externally generated. The water, hydrogen and energy may be provided for use both inside and outside of the enclosure 18. In other embodiments there may be multiple chemicals or minerals stored in the fuel chambers 22 that can be mixed to create energy.

The energy-transfer receptacle 24 generally is exposed, or at least accessible, along an exterior of the enclosure 18. The energy-transfer receptacle 24 is configured to transfer the energy output generated by the energy generating device 16, and/or railcar chassis 26, to an energy consuming or transferring device or system. In one exemplary embodiment, the energy-transfer receptacles 24 are configured to couple to and transfer at least a portion of an electric power output to an electric-powered vehicle. In another exemplary embodiment, the energy-transfer receptacles 24 are configured to connect to and transfer at least a portion of an electric power output to a power grid. As such, in one exemplary embodiment, an energy generating module 14 may be configured with one energy-transfer receptacle 24 configured to transfer at least a portion of an electric power output to vehicles and another energy-transfer receptacle 24 configured to transfer at least a portion of an electric power output to a power grid, simultaneously or independently. In addition, the energy generating module 14 may comprise a fuel-transfer receptacle configured to transfer fuel from the fuel chamber 22 to vehicles. As such, in another exemplary embodiment, an energy generating module 14 may be configured to transfer an electric power output to a vehicle, an electric power output to a power grid, and fuel to a vehicle, simultaneously or independently.

Figure 6:
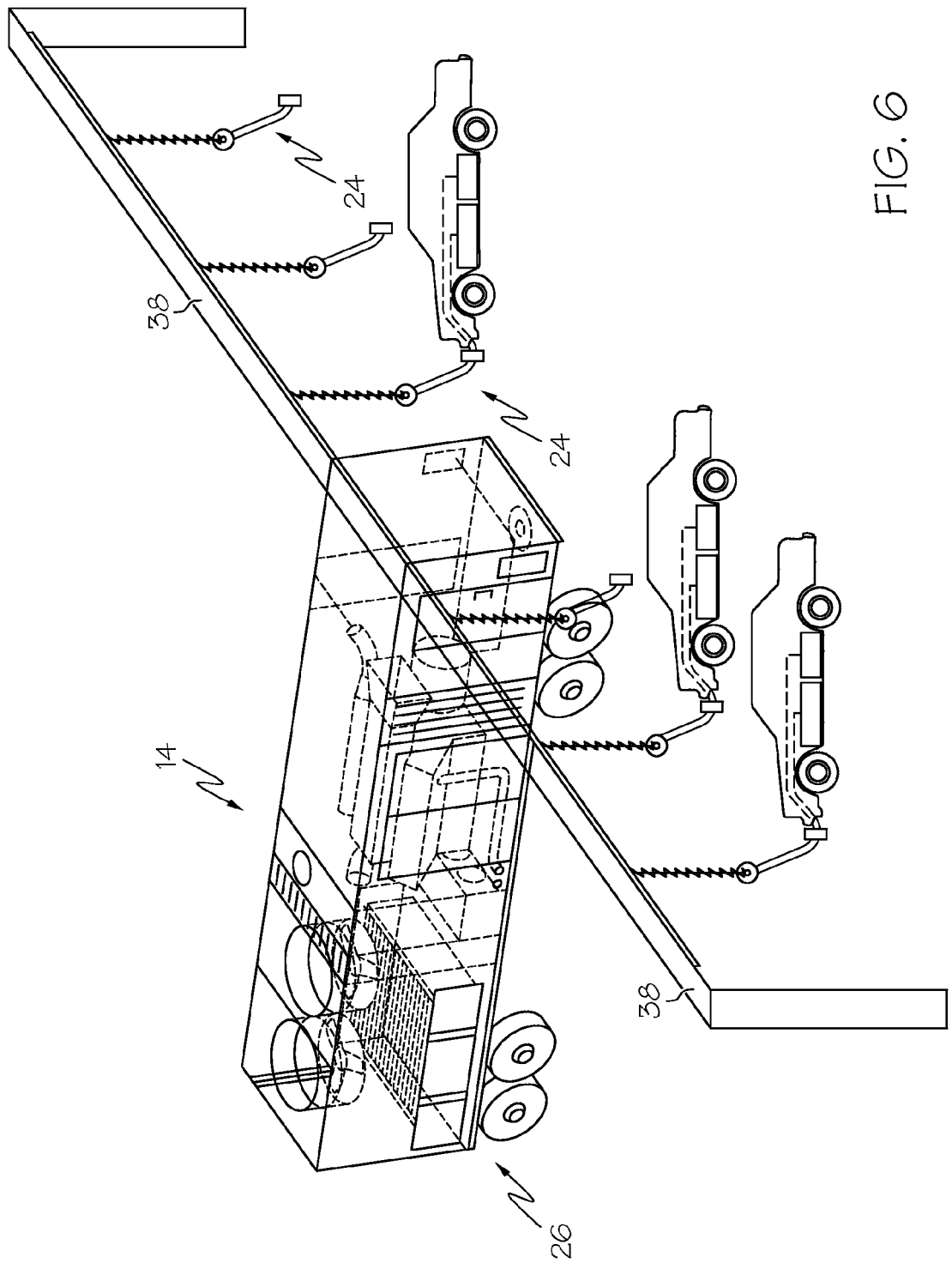
FIG. 6 is an illustration of a perspective view of a boom system of an energy generating module according to one or more embodiments.

As shown in FIG. 6, the energy generating module 14 also may comprise a boom system 38. The boom system 38 may support a plurality of energy-transfer receptacles 24 to enable greater transfer of energy output from the energy generating module 14. More particularly, the enclosure 18 of the energy generating module 14 may comprise a boom system 38 that is extendable from and retractable to an exterior of the enclosure 18. As such, the boom system 38 may extend and retract between retracted positions in-line with, and conforming to, footprints of the exterior of the enclosure 18 and extended positions projecting outward, angularly or perpendicularly from the exterior of the enclosure 18. The boom system 38 may deploy a plurality of energy-transfer receptacles 24 when projecting outward from the exterior of the enclosure to permit multiple, simultaneous transfers of energy output to any variety of energy consuming or transferring devices or systems. For example, one energy-transfer receptacle 24 may be coupled to a vehicle while another energy-transfer receptacle 24 may be connected to a power grid. The boom system 38 may also project upward and outward from the exterior of the enclosure 18 to provide energy-transfer receptacles to an energy consuming or transferring device or system from above the enclosure. For example, an energy-transfer receptacle 24 may be connected to a power grid transfer line that is above the enclosure 18. Further, an energy transfer receptacle 24 may be provided on the boom system 38 in an upward direction to provide fuel and/or electrical power to an airborne vehicle that is hovering above the enclosure 18. For example, the boom system 38 may be operable to deploy an energy-transfer receptacle upwardly to mate with a corresponding fuel port of an aerial vehicle such that the aerial vehicle may be refueled during flight without landing. The boom system 38 and energy-transfer receptacle 24 may be deployed in accordance with control signals provided by an operator of the energy generating module 14 or they may be deployed automatically. The energy generating module 14 may also include a fuel pumping system to pump fuel from within the fuel chamber or chambers 22 to the energy consuming or transferring device.

The boom system 38 may extend from and retract to the enclosure in any variety of ways, whether by pivoting, folding, collapsing, inserting into the enclosure 18, or otherwise, or combinations thereof. In one exemplary embodiment, the boom system 38 is pivotable about one or more points of connection with the exterior of the enclosure 18 such that the boom system 38 may pivot between retracted positions in-line with, and conforming to, footprints of the exterior of the enclosure 18 and extended positions projecting outward from the exterior of the enclosure 18. In another exemplary embodiment, the boom system 38 is telescopically extendable and retractable with respect to points of connection between the boom system 38 and the exterior of the enclosure 18. In yet another exemplary embodiment, the boom system 38 is extendable from and retractable to cavities within the exterior of the enclosure 18.

As mentioned above, the fuel chamber 22 is configured to contain fuel for use by the energy generating device 16 to generate an energy output and also for transfer to vehicles for refueling purposes. The energy generating module 14 may also include a fuel pump system to pump fuel from the fuel chambers 22 to an external device via the energy-transfer receptacle or receptacles 24. Referring to FIGS. 9A-12, the fuel chambers 22 may assume any variety of configurations sufficient to perform the purposes described herein. The fuel chamber 22 of the energy generating module 14 may be configured as an intra-wall fuel chamber disposed between exterior and interior enclosure walls 18A, 18B of the enclosure 18. More particularly, the fuel chamber 22 may utilize the existing exterior and interior enclosure walls 18A, 18B (roof, floor, sidewalls, and endwalls) of the enclosure 18 of the energy generating module 14 as one or more walls of the fuel chamber 22—whether a double-walled fuel chamber or single-walled fuel chamber, as described in greater detail herein. Additional embodiments of the fuel chamber 22 are contemplated wherein the fuel chamber 22 is configured as any multiple-wall structure, whether double-wall, triple-wall, or other, that comprises a plurality of containment tanks.

In one exemplary embodiment, the fuel chamber 22 is a sealed chamber positioned within the interior of the enclosure 18. In another exemplary embodiment, shown in FIG. 10, the fuel chamber 22 may be described as a double-walled fuel chamber. Here, the fuel chamber 22 comprises a primary containment tank 40 contained within a secondary containment tank 42. The primary containment tank 40 and the secondary containment tank 42 may be separated by one or more interstitial spaces 44. The exterior enclosure walls 18A and the interior enclosure walls 18B of the enclosure 18 cooperate to form the secondary containment tank 42 of the fuel chamber 22 such that the primary containment tank 40 is disposed between the exterior enclosure walls 18A and the interior enclosure walls 18B.

Figure 9A:
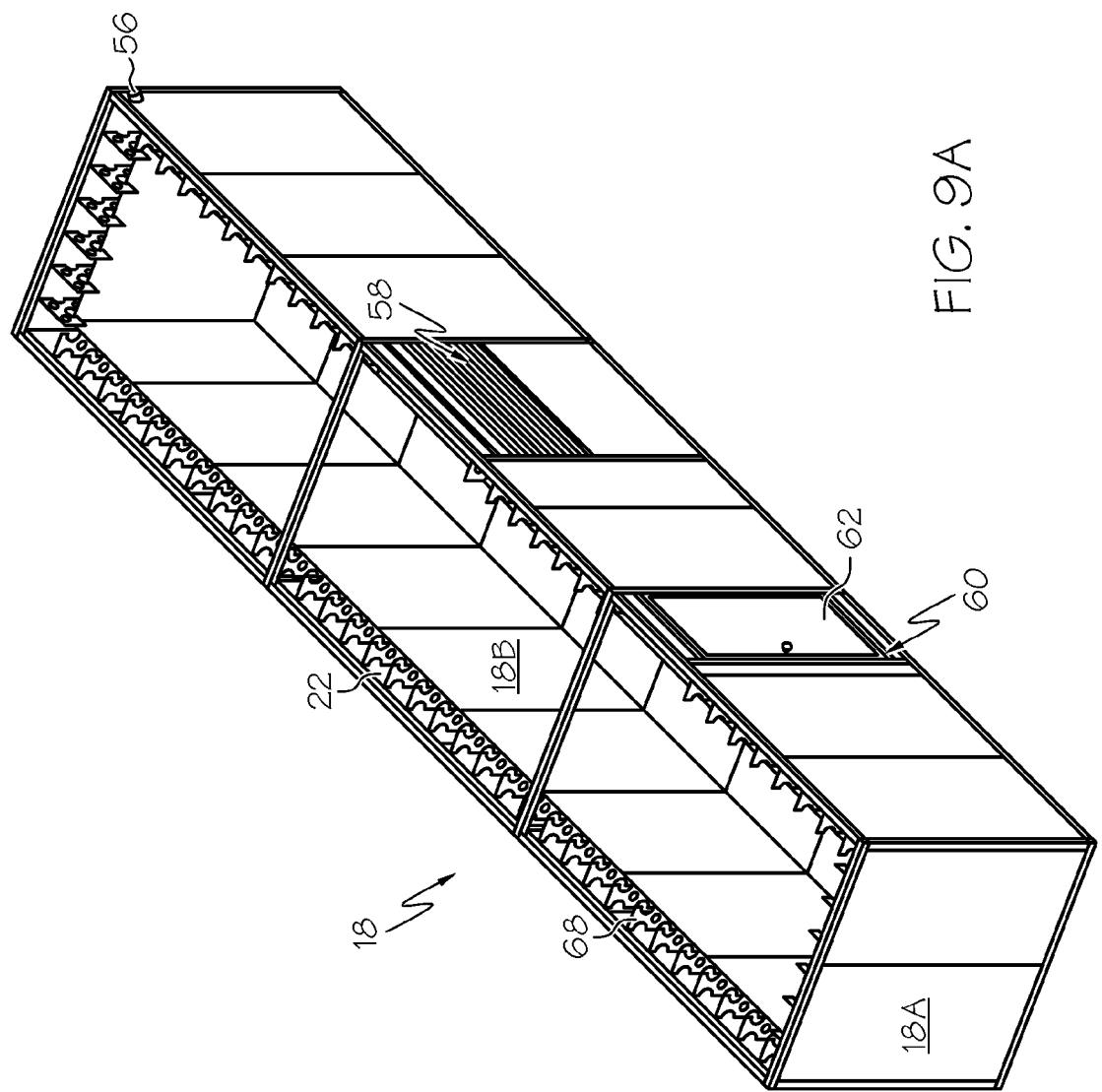
FIG. 9A is an illustration of a perspective view of an enclosure of an energy generating module comprising an intra-wall fuel chamber according to one or more embodiments.

In another exemplary embodiment, shown in FIG. 9A, the fuel chamber 22 may be described as a single-walled fuel chamber. Rather than the provision of the primary and secondary containment tanks 40, 42, with the secondary containment tank 42 being formed through the cooperation of the exterior and interior enclosure walls 18A, 18B, as described above, here, the exterior enclosure walls 18A and the interior enclosure walls 18B cooperate to form the fuel chamber 22 such that the fuel chamber is disposed between the exterior and interior enclosure walls 18A, 18B.

Figure 9B:
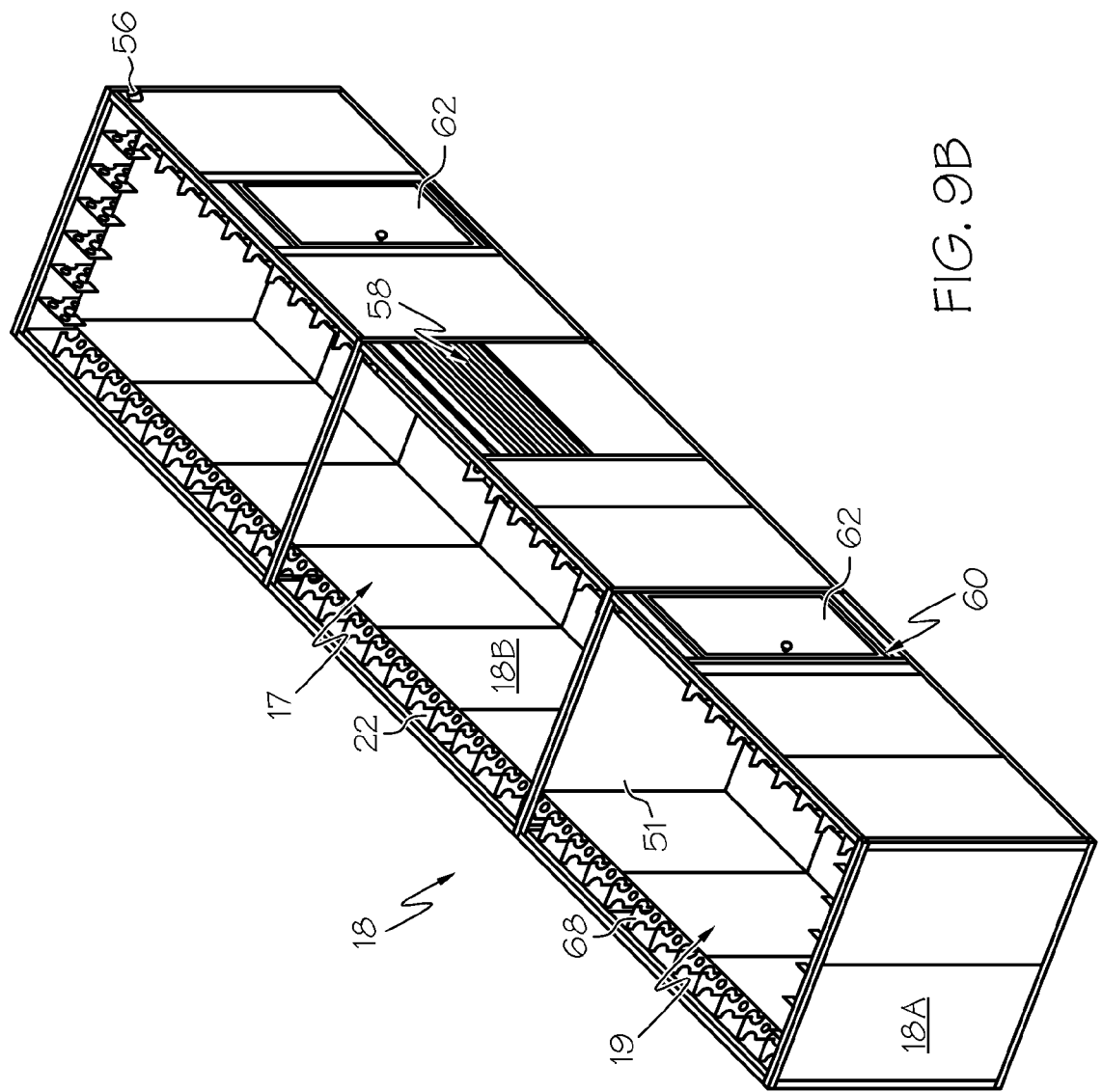
FIG. 9B is an illustration of a perspective view of an enclosure of an energy generating module comprising an intra-wall fuel chamber and an interior dividing wall according to one or more embodiments.

Referring now to FIG. 9B, an exemplary embodiment of an enclosure 18 having an energy generating section 17 and a multipurpose section 19 is illustrated. The enclosure 18 of this embodiment includes an interior dividing wall 51 that divides the space of the enclosure into two sections. One of the sections may include an energy generating section 17 that is sized and configured to maintain the modular cage 20 and further an energy generating device 16 and related equipment. The multipurpose section 19 may be used for a variety of purposes. For example, the multipurpose section 19 may be used to store articles (e.g., equipment, tools, food and water), maintain energy storage devices such as batteries, provide a livable space for persons operating in remote locations and in need of shelter. When used as a livable space, the multipurpose section 19 may include a bed, furniture, plumbing, lighting, electrical systems, cooking equipment, etc as described hereinbelow.

Figure 11:
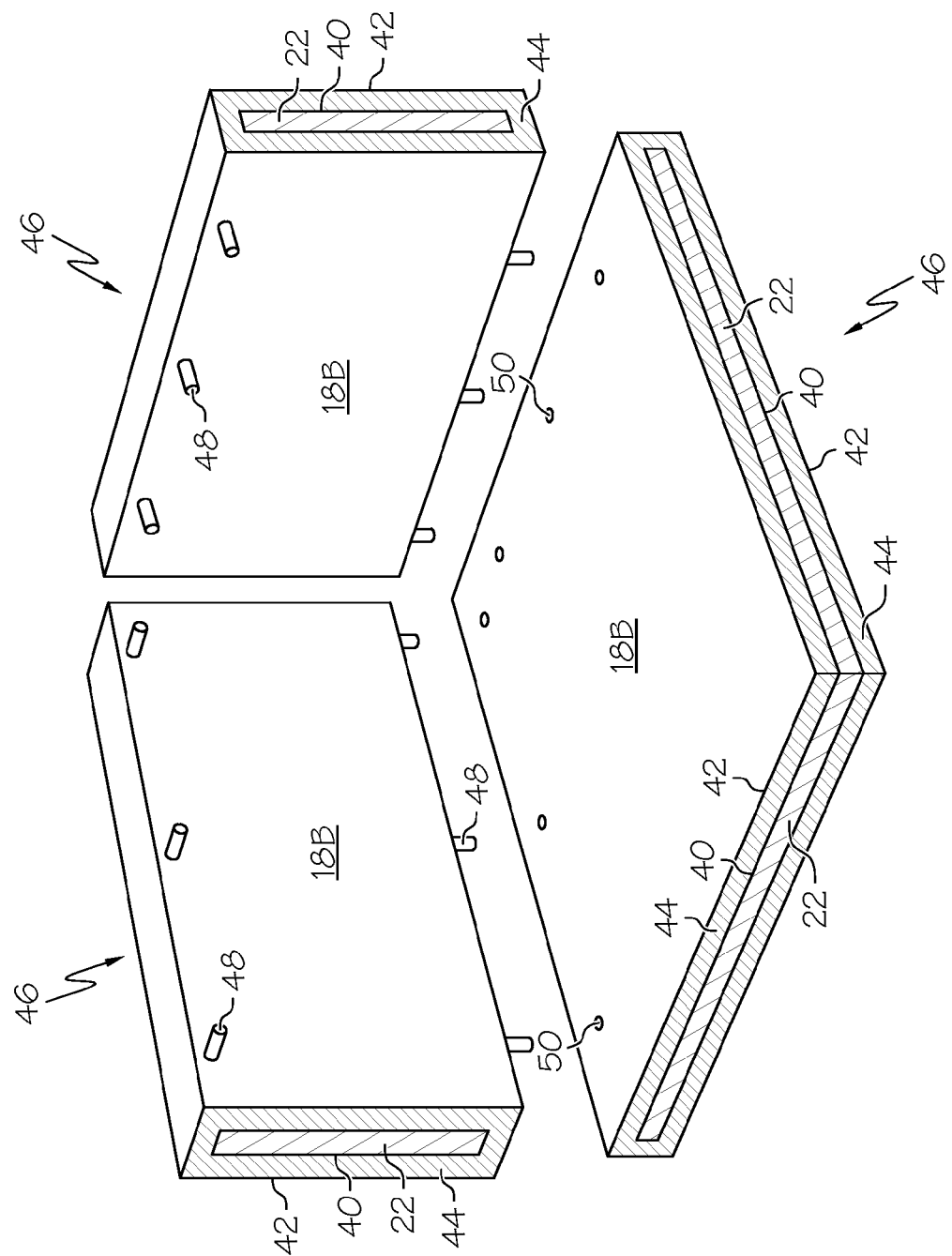
FIG. 11 is an illustration of a perspective view of a plurality of modular energy panels forming an enclosure of an energy generating module according to one or more embodiments.

Further, in yet another exemplary embodiment of the fuel chamber 22, shown in FIGS. 11 and 12, the fuel chamber 22 may be configured as interconnecting modular energy panels 46. More particularly, the modular energy panels 46 may interconnect such that exterior surfaces of the interconnected modular energy panels 46 cooperate to form both exterior enclosure walls 18A of the enclosure 18 and interior enclosure walls 18B of the enclosure 18. As such, the roof, the floor, the sidewalls, and the endwalls, or any combinations thereof, of the enclosure 18 may be formed by interconnected modular energy panels 46.

In one exemplary embodiment, the modular energy panels 46 are configured as double-wall structures that comprise primary containment tanks contained within secondary containment tanks, the primary and secondary containment tanks separated by interstitial spaces. The primary containment tanks of the modular energy panels 46 may comprise one or more cells configured to contain fuel and/or energy. Exterior surfaces of the secondary containment tanks of the modular energy panels 46 cooperate to form exterior and interior walls of the enclosure 18 such that the fuel contained within the cells is held between the exterior and interior enclosure walls 18A, 18B. In another exemplary embodiment, the modular energy panels 46 are configured as single-wall structures configured to contain fuel. Exterior surfaces of the modular energy panels 46 cooperate to form exterior and interior walls of the enclosure 18 such that the fuel contained within the cells is held between the exterior and interior enclosure walls 18A, 18B.

As shown in FIG. 11, the modular energy panels 46 may be configured to interconnect by a plurality of corresponding pins 48 and recesses 50. As such, pins 48 on one modular energy panel 46 may insert into corresponding recesses 50 in an adjacent modular energy panel 46 so as to interconnect. The pins 48 and recesses 50 may be configured to interlock such that when interconnected, the pins 48 do not withdraw from the recesses 50. Withdrawal of the pins 48 from the recesses 50 may be controlled by operation of a release mechanism or otherwise. The release mechanism may be integrated into one or more of the modular energy panels 46 or may be controlled remotely from the modular energy panels 46. Further, the pins 48 and recesses 50 may be configured to convey or otherwise permit passage of fuel such that fuel may flow between the interconnected modular energy panels 46. Sealing devices, such as seals, gaskets, or o-rings, may be used to seal the interconnected pins 48 and recesses 50 to substantially prevent fuel from leaking from the points of interconnection. It is contemplated that the modular energy panels 46 may be configured to interconnect by one or more of any varieties of connections in addition to or other than the pins 48 and recesses 50, including, but not limited to, projections and slots/grooves and dovetailing connections. Also, additional fasteners and/or connectors may be used to further secure the interconnections between the modular energy panels 46.

Further the ability to interconnect the modular energy panels 46 to form an enclosure 18 may permit the removal of one or more modular energy panels 46 from an otherwise complete enclosure 18 should those modular energy panels 46 be damaged or otherwise compromised. The removed modular energy panel 46 may be replaced by another modular energy panel 46 that is interconnected with the remaining modular energy panels 46 forming the enclosure 18.

In another embodiment, the modular energy panels 46 may comprise interlocking battery devices capable of receiving, storing, generating and/or providing electrical energy as needed. The modular energy panels 46 may be connected to one another to provide a robust electrical energy source. The battery devices may be configured of one or more secondary cell devices including, but not limited to, lead acid, nickel cadmium, magnesium oxide, zinc oxide, nickel metal hydride, lithium hydride, and lithium ion polymer secondary cell devices. Further, the interlocking battery devices may be configured of one or more fuel cell devices such as proton exchange fuel cells, solid oxide fuel cells, hydrogen fuel cells, and molten carbonate fuel cells, for example. The modular energy panels 46 may be used individually from or in conjunction with an energy generating device 16 in providing energy to internal (e.g., electrical systems of the energy generating module 14) and external systems and devices (e.g., electric vehicles, equipment, power grid, etc.).

Figure 10:
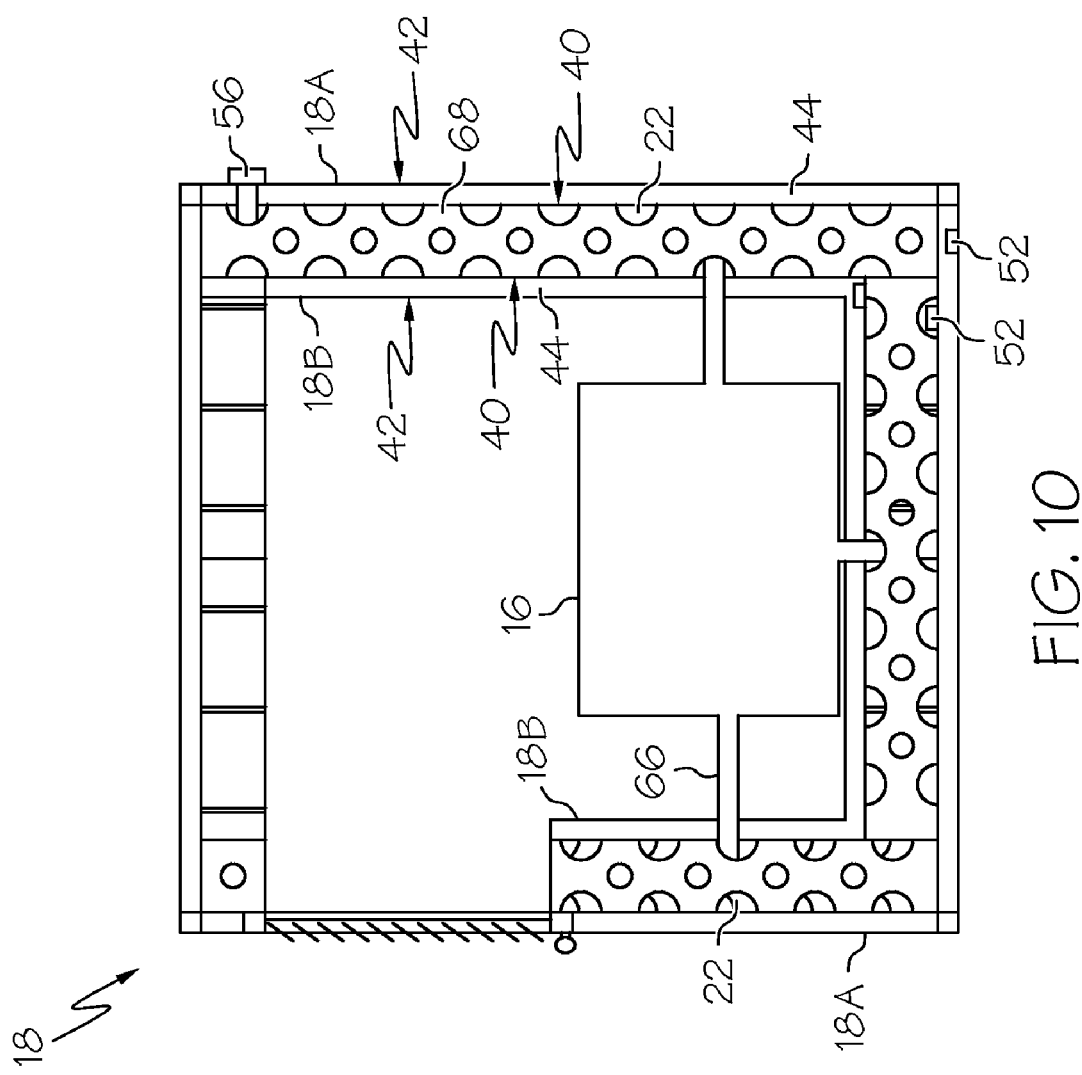
FIG. 10 is an illustration of a cross-sectional end view of an enclosure of an energy generating module comprising an intra-wall fuel chamber according to one or more embodiments.

With respect to the double-walled fuel chamber 22 embodiments, an example of which is shown in FIGS. 10-12, the primary and secondary containment tanks 40, 42 may be separated by one or more interstitial spaces 44. The width of the interstitial space 44 between the primary and secondary containment tanks 40, 42 may be determined by regulations or industry standards. While the primary containment tank 40 may be sealed to substantially preclude fuel leakage therefrom, leakage may occur due to a manufacturing defect in the energy generating module 14, a compromising of the exterior and interior enclosure walls 18A, 18B from collision with or puncturing by a foreign object, or other reason. As such, the interstitial spaces 44 may be configured to collect fuel that may leak from the primary containment tank 40. It is also contemplated that the secondary containment tank 42 may also be sealed so as to substantially preclude fuel leakage from the interstitial spaces 44 across the exterior and/or interior enclosure walls 18A, 18B.

In addition, one or more of the interstitial spaces 44 may be at least partially filled with concrete, insulation, or other matter to further attenuate noise emanating from the energy generating device 16 and to restrict the puncturing of both the primary and secondary containment tanks 40, 42 with a foreign object. This insulating matter may be further configured or provided in such a way within the interstitial spaces 44 to permit a flow of fuel therethrough so as not to obstruct fuel from appropriate sensing by the energy generating module 14, as described in greater detail below. The interstitial spaces 44 may also permit the storage of other materials, such as batteries or other goods and equipment. Further, dimensions of the interstitial spaces 44 may be maintained by a brace that may be welded perpendicularly to the walls of the primary and secondary containment tanks 40, 42 (i.e. the exterior and interior enclosure walls 18A, 18B). This brace may be configured to support these walls and to allow fuel to pass therethrough should there be a leak in the primary containment tank 40.

In some embodiments portions of the exterior and/or interior enclosure walls of the enclosure 18 may be made of a transparent material such as tempered glass or plastic, for example, so that at least some external light may enter the enclosure 18. The transparent portions of the walls may provide a means for fuel level detection (i.e., a sight glass) without the need for an electronic or mechanical fuel gauge. Further, depending on the type of fuel stored within the fuel chamber 22, the transparent portions may enable light to enter the enclosure 18.

As further shown in FIG. 10, the energy generating module 14 may comprise one or more fuel sensors 52 positioned in the interstitial spaces 44 to sense a presence of fuel therein due to a leak in the primary containment tank 40. The interstitial spaces 44 generally are configured to direct fuel collected therein to a position of the fuel sensor 52 for sensing. Also, the energy generating module 14 may comprise one or more fuel sensors 52 in the primary containment tank 40 or in the single-walled fuel chamber 22 to sense levels of fuel contained therein and to notify an operator of the energy generating module 14 of a need to re-fuel.

Also, the configuration of embodiments of the energy generating module 14 with the fuel chamber 22, and fuel contained therein, that may substantially surround the interior of the energy generating module 14, and the energy generating device 18 generally enclosed therein, may provide significant sound attenuation of the noise generated by the energy generating device 18. Thereby, baffles and/or other sound-deafening materials positioned about an exterior of a energy generating module 14 and/or the energy generating device 18, as commonly found in the art, is not needed, saving additional time, material, labor, and money involved in use and construction.

Further, as shown in FIGS. 9A-10, the fuel chamber 22 may be supported internally by one or more baffles 68 configured to maintain predefined dimensions of the fuel chamber 22. The baffles 68 may be perforated so as to permit passage of fuel therethrough. It is also contemplated that sound insulating matter, such as, but not limited to concrete, insulation, or other matter, may also be provided internally to the fuel chamber 22 to provide additional noise attenuation benefits while not significantly interfering with a flow of fuel within the fuel chamber 22.

Further, the fuel chamber 22, both multiple-walled and single-walled embodiments, potentially provide significantly more cubic space for fuel containment given the amount of square feet along all six walls of the enclosure 18 can provide significantly more fuel capacity when compared to conventional energy generating module fuel tanks. Therefore, depending upon the rate of fuel consumption, the runtime of the energy generating module 14 in generating an energy output may increase significantly and may require far fewer re-fueling trips for a fuel tanker and manpower to re-fuel the energy generating module 14 in comparison to conventional energy generating module fuel tanks.

Figure 7:
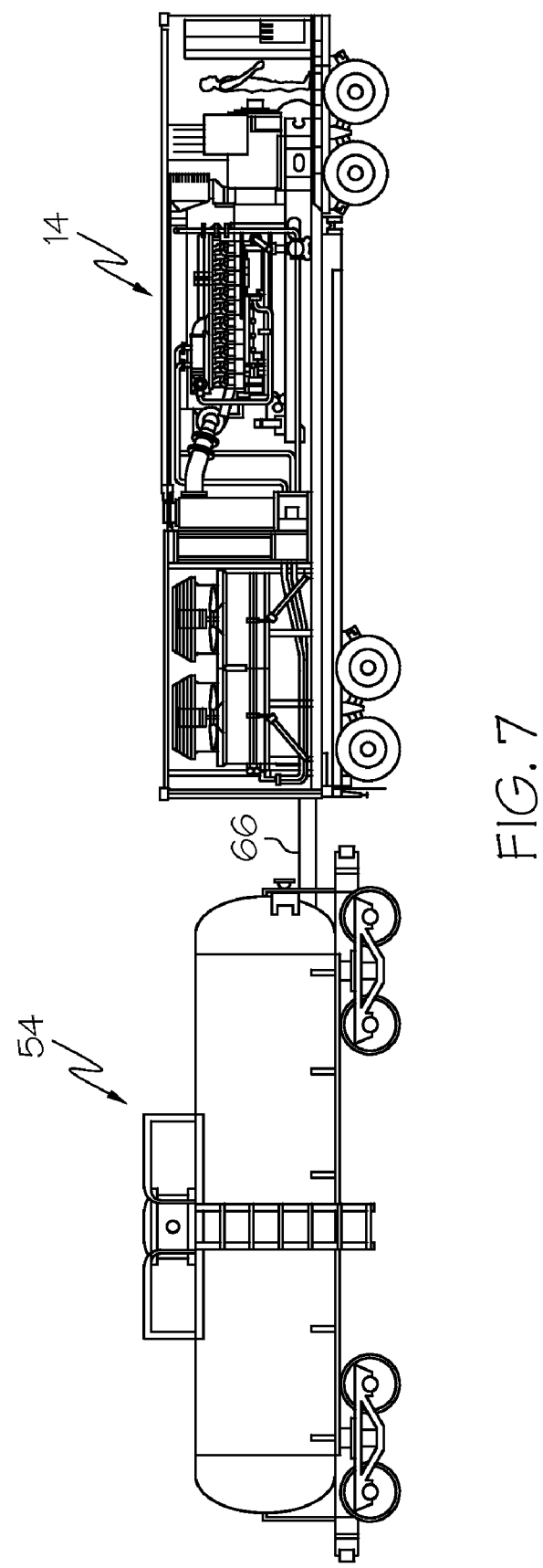
FIG. 7 is an illustration of a side view of an energy generating module and a tanker railcar according to one or more embodiments.
Figure 8:
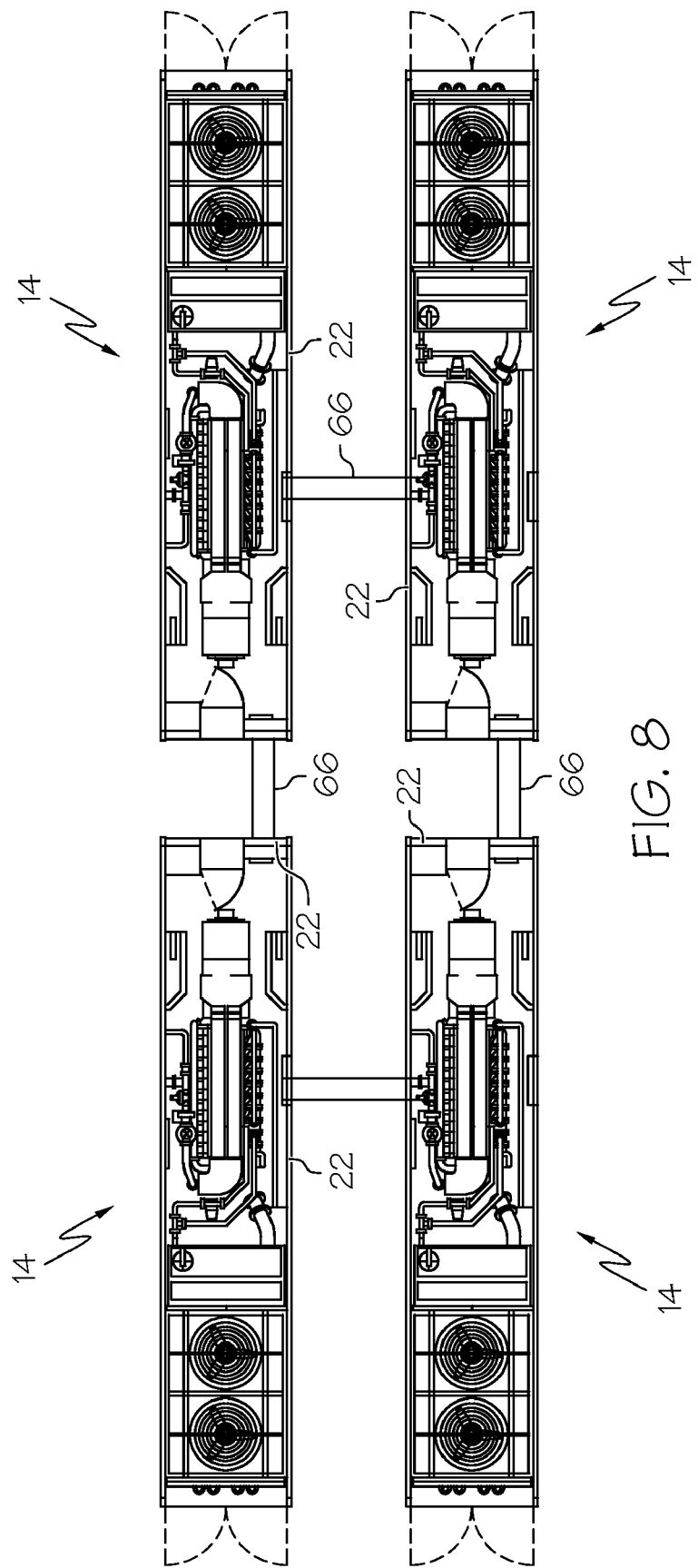
FIG. 8 is an illustration of a cross-sectional top view of a plurality of interconnected energy generating modules according to one or more embodiments.

In addition, as shown in FIG. 8 with reference to an intrawall fuel chamber described herein, the fuel chamber 22 of one energy generating module 14 may be connected to the fuel chamber 22 of another nearby energy generating module 14. Thereby, a plurality of interconnected energy generating modules 14 may be provided to produce a greater, cumulative energy output than available through a single, isolated energy generating module 14. For example, but not by way of limitation, multiple adjacent energy generating modules 14 in fluid communication and all configured to and capable of sharing fuel contained in their respective fuel chambers 22 through fuel conveying devices, such as hoses, tubes, valves, clamps, etc., may be provided. Further, as shown in FIG. 7, the energy generating module 14 may be connected to a tanker truck or tanker railcar 54 that may contain several thousand gallons of fuel in addition to that contained in the fuel chambers 22.

The energy generating module 14 also may comprise one or more sealable ports 56. The sealable ports 56 may be configured to permit passage of fuel across the exterior enclosure walls 18A and the primary containment tank 40, if present, for inserting or withdrawing fuel in the fuel chamber 22. The provision of multiple sealable ports 56 to the energy generating module 14 offers greater re-fueling flexibility, if access to a sealable port 56 is obstructed or otherwise prevented, and may reduce the time necessary for re-fueling. It is contemplated that where the primary containment tank 40 or the single-walled fuel chamber 22 is divided internally into multiple, independent cells, a sealable port 56 may be provided to each cell. Thereby, in such embodiments, the independent cells may be filled simultaneously with a common fuel or with various types of fuel, further reducing the time necessary to re-fuel the energy generating module 14.

In addition, fuel utilized by the energy generating module 14 and contained in the fuel chamber 22 is not limited to any particular fuel type. Rather, the fuel may be, but is not limited to, any petroleum-based fuel, such as oil, gasoline, diesel, jet fuel, kerosene, or liquefied natural gas, or any biofuel. It is also contemplated that the fuel may be a compressed or uncompressed gas such as hydrogen, propane, methane, or other gas. Further, in some embodiments, the fuel chamber 22 and/or portions of the enclosure 18 may be pressurized such that energy requiring pressurization such as gases or liquid may be stored within the energy generating module 14. For example, refrigerants may be stored within one or more cells of the fuel chamber 22 in an embodiment of the power generating module that utilizes a chiller or cooler. It is contemplated that any pressurized gas, liquid or energy source may be stored within the fuel chamber 22 and or portions of the enclosure 18.

In fact, as mentioned above, individually sealed cells of the fuel chamber 22, if present, may contain different types of fuels. This permits not only energy output generation, but also re-fueling of vehicles that utilize various fuel types. Thereby, not only may a power grid or other electrical system be powered by energy output transferred from the energy generating module 14, but a vehicle utilizing any one of a variety of fuel types may be re-fueled with fuel in the fuel chamber 22 at the same energy generating module 14. In addition, the storage of various fuel types also enables the energy generating device 18 to use one or more of any variety of fuel types to generate energy output. As discussed above, multiple energy generating devices may be provided within an energy generating module 14. The sealed and separated fuel cells may enable a first type of energy generating device, such as a diesel engine, for example, to be in fluid communication with a first type of fuel, and a second energy generating device, such as a chiller, for example, to be in fluid communication with a second type of fuel. It should be understood that more than two types of fuel and energy generating devices may be provided within the energy generating module 14. In this manner, embodiments of the energy generating module 14 may provide fuel to different types of equipment having different fuel requirements.

Figure 13:
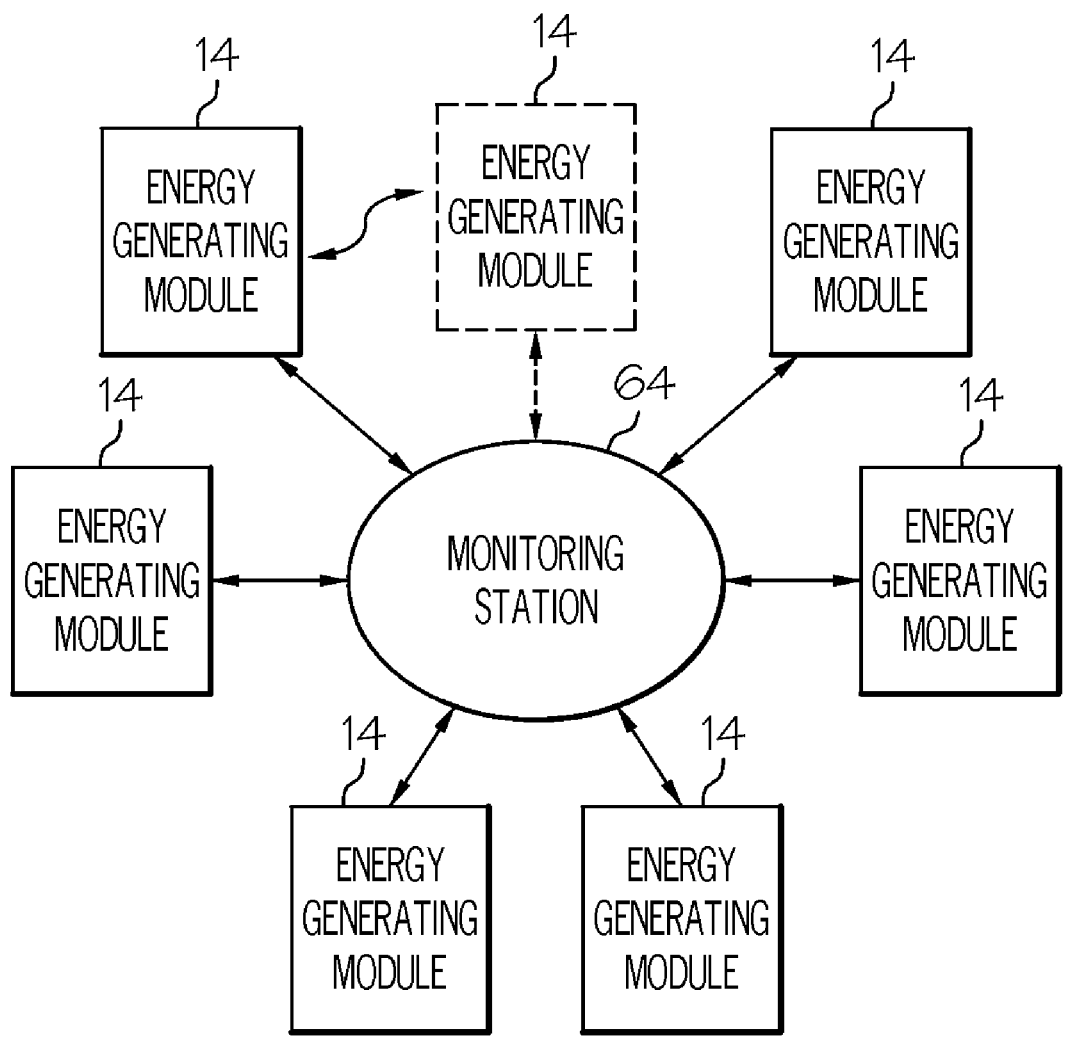
FIG. 13 is a diagram of a network of a plurality of energy generating modules according to one or more embodiments.

With the energy generating module 14 comprising an energy generating device 18 and a fuel chamber 22, along with other components necessary for the generation of an energy output, the energy generating module 14 is self-contained and is independent of any outside resources, with the exception of refueling the fuel chamber 22, that may be needed to generate and transfer an energy output and/or fuel. Thereby, the energy generating module 14 may operate independently of personnel, outside of occasional temporary maintenance, refueling, power grid connection/disconnection, and transportation of the energy generating module 14. Remaining operations of the energy generating module 14 may be self-performed by the energy generating modules 14 or may be controlled and/or monitored remotely by a monitoring station 64, shown in FIG. 13, configured to communicate with the energy generating module 14 to monitor and/or control one or more conditions of the energy generating module 14 and possibly direct an energy generating module 14 to a new location through transportation over a rail network. With respect to the refueling of vehicles, according to one exemplary embodiment, vehicle operators may park their vehicles along side an energy generating module 14, couple fuel dispensing receptacles, or other similar devices, of the energy generating module 14 to their vehicles, and transfer energy output and/or dispense fuel from the fuel chamber 22 to the vehicle for re-energizing and/or refueling purposes. Further, the energy generating modules 14 may be configured such that vehicle operators may to transact energy output and/or fuel purchases through credit card or other payment transactions, eliminating the need for personnel on site to handle payment arrangements. For example, but not by way of limitation, vehicle operators may swipe a credit cards in a card-reading mechanism affixed to and/or linked with the energy generating module 14 to pre-pay for the energy output and/or fuel, as currently offered at most fueling stations.

Also, the energy generating module 14 generally comprises interior electrical devices, components and systems in addition to the enclosure 18, energy generating device 18, and fuel chamber 22 that may be necessary for, or facilitative of, energy output generation. These additional components may include, but are not limited to: an alternator, a battery or other energy-storing device, DC lighting systems, electrical controls such as engine switchgear or a voltage changeover board, sound attenuation, fire suppression systems, personnel doors, fuel tank, louvers for ventilation, fan cooling system, and an exhaust system. Any combination of these items may be considered to be energy generating module 14. The exhaust system may be configured to include environmentally-friendly scrubbers to remove, or substantially remove, toxic or harmful substances from the exhaust generated by the energy generating device 18, such as NOx. Further, for construction of the energy generating module 14, the energy generating device 18, alternator, electrical controls, air circulation, exhaust systems, and other components may be manufactured in and/or provided by separate facilities. Once constructed and appropriately configured, the energy generating device 18 may be placed within the interior of the enclosure 18 of the energy generating module 14.

As shown in FIGS. 9A, 9B and 12, the energy generating module 14 may also comprise louvers 58 for ventilation, a doorway 60, and a door 62 for access to what generally is the internally enclosed energy generating device 16. More particularly, portions of the exterior and interior enclosure walls 18A, 18B of the enclosure 18 may comprise a plurality of closable louvers and a doorway for personnel to access the energy generating device 18. In addition to the louvers, the energy generating modules 14 may also comprise a fan cooling system to cool the energy generating device 18. The louvers and/or the cooling system may be configured to draw air in from a roof, ends, and/or sides of the enclosure 18. Such configurations may ensure that there is sufficient air flow to support and cool the energy generating device 18 and assist with exhaust. Further, such configurations may adequately cool an interior workspace area of the enclosure 18 to permit access by personnel.

In addition, the energy generating module 14 may comprise a retractable ladder and/or boom for personnel access and for hoisting tools, equipment, or supplies into and out of the energy generating module 14. In one exemplary embodiment, the retractable ladder and/or boom is folded and affixed to an interior of the door of the enclosure 18. Thereby, as an operator opens the door, the operator can gain access to the ladder and/or boom for easy and quick entry of the enclosure 18. More particularly, after the door is opened, the operator may unfold the ladder to lower it onto a ground surface and may lower the boom for hoisting of materials. The ladder may comprise handrails, wide step treads, and a gentle slope to enhance use thereof.

Further, the energy generating module 14 may comprise a security system. This security system may include features ranging from sounding an alarm when the energy generating module 14 has been tampered with to video surveillance to sealing of the enclosure 18 to protect from bio-hazardous or other toxic environments. For example, the energy generating module 14 may be configured to seal openings in the enclosure 18 to the outside environment, such as sealing the louvers, door jams, and exhausts. In such embodiments, the energy generating module 14 may be fully operational with self-contained air conditioning to cool the interior and the energy generating device 18 and other components and to clean and/or recirculate the exhaust gases. Such security systems may be monitored and controlled remotely by the monitoring station 64 and/or the energy generating module 14 may be configured to self-detect the presence of threatening environmental conditions and control the sealing and opening of the energy generating module 14 accordingly. In addition, the security system may also be used to restrict access to the interior of the power module by utilizing biometric identification systems, such as retinal, fingerprint, and facial construction scans, or touch pad, password protection systems.

An energy generating module 14 may also be configured as a habitable enclosure for persons to live, work and perform other activities. For example, the enclosure 18 may define a livable space having a bed, furniture, plumbing, lighting, electrical systems, cooking equipment, etc. The energy generating module 14 may be configured as an emergency trailer that provides emergency shelter, a mobile home, a module home, a prefabricated home, etc. The energy generating module 14 may be used solely for sheltering individuals or it may also be used to both generate power with a power generating device as well as shelter people and/or store goods. Energy generating modules 14 defining a livable space may be beneficial to persons working in remote locations as they may provide shelter as well as fuel and power.

While the description provided herein is primarily directed to the use of networks of energy generating modules 14 to transfer energy output and/or fuel to vehicles and power grids, it is contemplated that embodiments may also or alternatively be used to transfer energy output and/or fuel to marine vessels, aircraft, or any other energy consuming craft, vessel, or vehicle. For example, an energy generating module 14 may be positioned on or near a dock or port where the energy generating module 14, such as one comprising a boom system 38, is used to transfer energy output and/or fuel to one or more marine vessels.

Further, it is also contemplated that some embodiments of energy generating modules may not comprise a respective railcar chassis. Rather, one or more enclosures at least partially enclosing an energy generating device may be supported on one or more railcars, whether the railcars are intermodal railcars, railway flatcars, railway freight cars, enclosure-type railcars, or other railcars. Also, multiple enclosures may be stacked on top of each other on one or more railcars. Stacking enclosures may offer designers and/or engineers added flexibility to configure up to, for example, but not limited to, four enclosures, each possibly enclosing one or more energy generating devices, on a single railcar. For example, instead of separately moving up to four enclosures, designers and/or engineers can provide, for example, up to 400% more energy output from four interconnected or separate enclosures and energy generating devices from a single railcar. Further, it is contemplated that more or less than four enclosures may be supported by a single railcar. In addition, it is contemplated that an energy generating device may be supported on a railcar without an enclosure 18 or other structure at least partially enclosing the energy generating device.

Additionally, it is contemplated that two or more railcars may support one or more energy generating modules coupled to form an energy generating system that may be configured to provide, for example, virtually any desired electric power output. Also, energy generating modules supported on two or more railcars may be interconnected wherein the energy generating modules on each railcar perform a specific purpose in generating an energy output. For example, one railcar may support one or more energy generating module(s) to generate electric power output, while another railcar may support a cooling system for the energy generating device(s) and other components, while another railcar may support a fuel chamber, while yet another railcar may support an air filtration and scrubbing system for intake and exhaust air for the energy generating device(s).

More particularly, in one exemplary embodiment, an energy generating system comprises an energy generating device, a fuel chamber, a cooling system, an energy-transfer receptacle, an enclosure-type railcar, and one or more peripheral railcars. The energy generating system is transportable on rails via the enclosure-type railcar and the peripheral railcars. The energy generating device is enclosed within the enclosure-type railcar and the fuel chamber and the cooling system are supported by the peripheral railcars. As such, the fuel chamber and the cooling system are remote from the energy generating device. The fuel chamber is in fluid communication with the energy generating device via one or more fuel conveying devices and is configured to provide fuel to the energy generating device for energy output generation. The cooling system, meanwhile, is in fluid communication with the energy generating device via one or more fluid conveying devices and is configured to cool the energy generating device during energy output generation.

Further, in another exemplary embodiment, shown in FIG. 8, multiple energy generating modules 14 may be interconnected to develop an energy generating system of interconnected energy generating modules 14. The interconnected energy generating modules 14 may also be coupled by fuel conveying devices 66 so as to share respective fuel supplies. This embodiment creates, for example, an ability to increase electric power output by interconnecting as many energy generating modules 14 as necessary to attain desired levels of electric power output. As such, for applications where more electric power output is required than can otherwise be provided from a given energy generating module 14 in isolation, then an energy generating system of multiple energy generating modules 14 can be connected to create an energy generating module system to produce an even greater electric power output.

It is noted that recitations herein of a component of an embodiment being "configured"in a particular way or to embody a particular property, or function in a particular manner, are structural recitations as opposed to recitations of intended use. More specifically, the references herein to the manner in which a component is "configured" denotes an existing physical condition of the component and, as such, is to be taken as a definite recitation of the structural characteristics of the component.

It is noted that terms like "generally" and "typically," when utilized herein, are not utilized to limit the scope of the claimed embodiments or to imply that certain features are critical, essential, or even important to the structure or function of the claimed embodiments. Rather, these terms are merely intended to identify particular aspects of an embodiment or to emphasize alternative or additional features that may or may not be utilized in a particular embodiment.

For the purposes of describing and defining embodiments herein it is noted that the terms "substantially" and "approximately" are utilized herein to represent the inherent degree of uncertainty that may be attributed to any quantitative comparison, value, measurement, or other representation. The terms "substantially" and "approximately" are also utilized herein to represent the degree by which a quantitative representation may vary from a stated reference without resulting in a change in the basic function of the subject matter at issue.

Having described embodiments of the present disclosure in detail, and by reference to specific embodiments thereof, it will be apparent that modifications and variations are possible without departing from the scope of the embodiments defined in the appended claims. More specifically, although some aspects of embodiments of the present disclosure are identified herein as preferred or particularly advantageous, it is contemplated that the embodiments of the present disclosure are not necessarily limited to these preferred aspects.

What is claimed is:

1. An module comprising an enclosure, a modular cage, a fuel chamber, and a railcar chassis, wherein:
   the module is transportable on rails via the railcar chassis;
   the modular cage comprises a peripheral cage secured to an interior of the enclosure and one or more multi-directional extensions extending from the peripheral cage that are configured to support an energy generating device within the enclosure;
   the multi-directional extensions are configured to support the energy generating device by suspending the energy generating device during transportation of the energy generating module and are movable in multiple directions as the peripheral cage sways during transportation of the module so as to permit the energy generating device to track its inertial position more closely than the sway of the peripheral cage during transportation of the module; and
   the fuel chamber is configured to be in fluid communication with the energy generating device.

2. The module of claim 1 wherein the module further comprises an energy-transfer receptacle configured to be coupled to the energy generating device and transfer at least a portion of an energy output from the energy generating device to an energy consuming or transferring device.

3. The module of claim 2 wherein the energy consuming device comprises a vehicle.

4. The module of claim 2 wherein the energy consuming device comprises a device maintained within the enclosure.

5. The module of claim 2 wherein the energy-transfer receptacle is further configured to receive an energy input from an energy producing device.

6. The module of claim 1 wherein:
   the enclosure comprises a boom system extendable from and retractable to an exterior of the enclosure such that the boom system may extend and retract between a position in-line with, and conforming to, a footprint of the exterior of the enclosure and a position projecting outward, upward or a combination of outward and upward from the exterior of the enclosure; and
   the boom system deploys a plurality of energy-transfer receptacles when projecting outward or upward from the exterior of the enclosure.

7. The module of claim 1 wherein the enclosure is integrally formed with the railcar chassis such that the railcar chassis and the enclosure cooperate to form a railway freighting car.

8. The module of claim 1 wherein:
   the railcar chassis is integrally formed with an intermodal railcar, and
   the enclosure is supported by the intermodal railcar.

9. The module of claim 1 wherein the module is removably coupled to the railcar chassis.

10. The module of claim 1 wherein the module further comprises a power generating device supported by the multi-directional extensions of the modular cage and configured to generate electrical power.

11. The module of claim 1 wherein the module further comprises a wind turbine engine coupled to an exterior surface of the enclosure and operable to generate electrical power as the module is transported on the rails.

12. The module of claim 11 wherein the enclosure further comprises an exterior aerodynamic feature operable to channel air passing over the module toward the wind turbine engine.

13. The module of claim 1 wherein:
the enclosure comprises an energy generating device section and a multipurpose section separated by an interior dividing wall; and
the modular cage is disposed within the energy generating device section.

14. The module of claim 13 wherein the multipurpose section comprises a livable space.

15. The module of claim 1 wherein the multi-directional extensions each define multiple directions of movement.

16. The module of claim 1 wherein at least one of the multi-directional extensions defines a single direction of movement and the multi-directional extensions collectively define multiple directions of movement.

17. The module of claim 1 wherein the multi-directional extensions are moveable in multiple directions so as to permit the energy generating device to track its lateral inertial position, its vertical inertial position, or a combination thereof, more closely than the sway of the peripheral cage during transportation of the module.

18. The module of claim 1 wherein the modular cage further comprises one or more movement dampening mechanisms to dampen movement of one or more of the multi-directional extensions during transportation of the module.

19. The module of claim 1 wherein the modular cage further comprises a suspension affixed to the peripheral cage that reduces the sway of the peripheral cage during transportation of the module.

20. The module of claim 1 wherein the modular cage is repeatably insertable into and withdrawable from an interior of the enclosure.

21. An module comprising an enclosure, a modular cage, a fuel chamber, a boom system, and a railcar chassis, wherein:
the module is transportable on rails via the railcar chassis;
the modular cage comprises a peripheral cage secured to an interior of the enclosure and one or more multi-directional extensions extending from the peripheral cage that are configured to support an energy generating device within the enclosure;
the fuel chamber is configured to be in fluid communication with the energy generating device;
the enclosure comprises a boom system extendable from and retractable to an exterior of the enclosure such that the boom system may extend and retract between a position in-line with, and conforming to, a footprint of the exterior of the enclosure and a position projecting outward, upward or a combination of outward and upward from the exterior of the enclosure; and
the boom system comprises a plurality of energy-transfer receptacles operable to be deployed when projecting outward or upward from the exterior of the enclosure.

22. An module comprising an enclosure, a modular cage, a fuel chamber, one or more peripheral railcars, and a railcar chassis, wherein:
the module is transportable on rails via the railcar chassis;
the modular cage comprises a peripheral cage secured to an interior of the enclosure and one or more multi-directional extensions extending from the peripheral cage that are configured to support an energy generating device within the enclosure;
the multi-directional extensions are movable in multiple directions as the peripheral cage sways during transportation of the module so as to permit the energy generating device to track its inertial position more closely than the sway of the peripheral cage during transportation of the module; and
the fuel chamber is supported by the peripheral railcars such that the fuel chamber is remotely coupled to the module.

\* \* \* \* \*

UNITED STATES PATENT AND TRADEMARK OFFICE
CERTIFICATE OF CORRECTION

| | | |
|---|---|---|
| PATENT NO. | : 8,294,285 B2 | Page 1 of 1 |
| APPLICATION NO. | : 12/605890 | |
| DATED | : October 23, 2012 | |
| INVENTOR(S) | : Jefferey Allen Hunter | |

It is certified that error appears in the above-identified patent and that said Letters Patent is hereby corrected as shown below:

In the Claims:

Col. 18, Claim 7, lines 60-61, "freighting car" should read --freight car--.

Signed and Sealed this
Fourth Day of June, 2013

Teresa Stanek Rea
*Acting Director of the United States Patent and Trademark Office*